United States Patent
Ikeda

(10) Patent No.: US 8,675,258 B2
(45) Date of Patent: Mar. 18, 2014

(54) IMAGE READER, IMAGE FORMING APPARATUS, AND METHOD OF CORRECTING IMAGE DATA

(75) Inventor: Ayako Ikeda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 250 days.

(21) Appl. No.: 13/176,887

(22) Filed: Jul. 6, 2011

(65) Prior Publication Data

US 2012/0013955 A1    Jan. 19, 2012

(30) Foreign Application Priority Data

Jul. 16, 2010  (JP) .................................. 2010-162296

(51) Int. Cl.
*H04N 1/40*    (2006.01)

(52) U.S. Cl.
USPC .......................................... 358/2.1; 358/468

(58) Field of Classification Search
USPC ........... 358/1.9, 2.1, 516–519, 448–449, 461, 358/465–468, 453
See application file for complete search history.

(56) References Cited

U.S. PATENT DOCUMENTS

| 5,825,513 A | * | 10/1998 | Hasegawa | 358/498 |
| 6,891,648 B2 | * | 5/2005 | Inoue et al. | 358/516 |
| 2010/0157387 A1 | * | 6/2010 | Chen | 358/488 |

FOREIGN PATENT DOCUMENTS

| EP | 1806913 A1 | * | 7/2007 |
| JP | 4-61560 | | 2/1992 |
| JP | 09284479 A | * | 10/1997 |
| JP | 3275541 | | 2/2002 |
| JP | 2004-254000 | | 9/2004 |
| JP | 2005-328156 | | 11/2005 |

* cited by examiner

*Primary Examiner* — Thomas D Lee
*Assistant Examiner* — Stephen M Brinich
(74) *Attorney, Agent, or Firm* — Oblon, Spivak, McClelland, Maier & Neustadt, L.L.P.

(57) ABSTRACT

The ratio between first reference data which is acquired by scanning the surface of a white member in a state where the size of a gap is substantially equal to that when a document is scanned and second reference data which is acquired by scanning the surface of the white member in a state where the size of the gap is smaller than that when the document is scanned is calculated as a reference data ratio, and the reference data ratio is stored. In generating shading data for correcting image data of each document, the reference data ratio being stored is multiplied by third reference data which is acquired by scanning the surface of the white member in a state where the size of the gap is substantially equal to that when the document is scanned, thereby generating shading data.

14 Claims, 14 Drawing Sheets

FIG.8
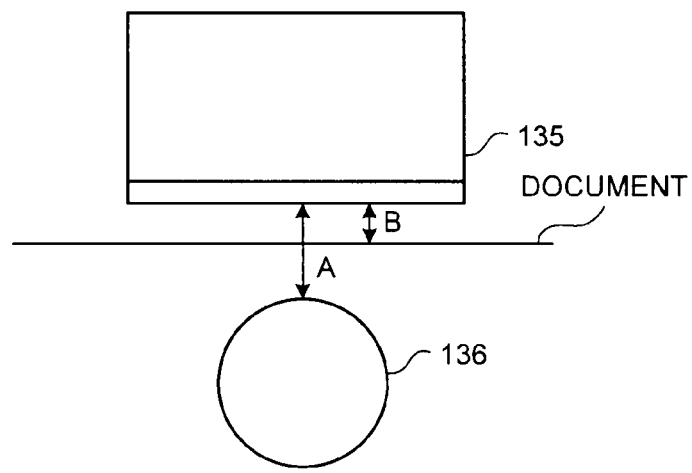
FIG.9A                    FIG.9B
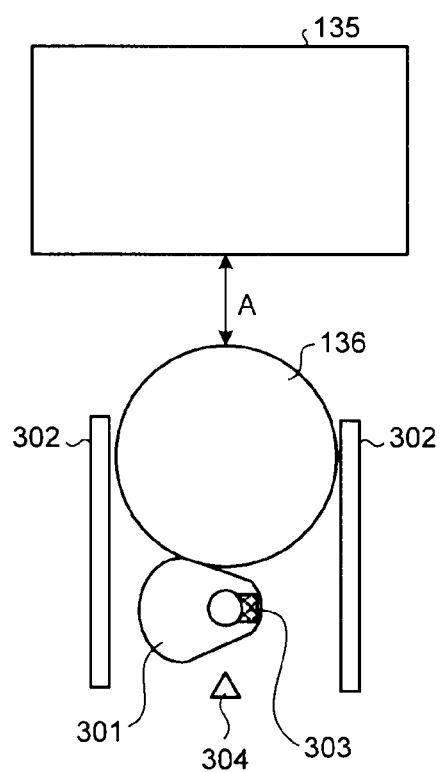 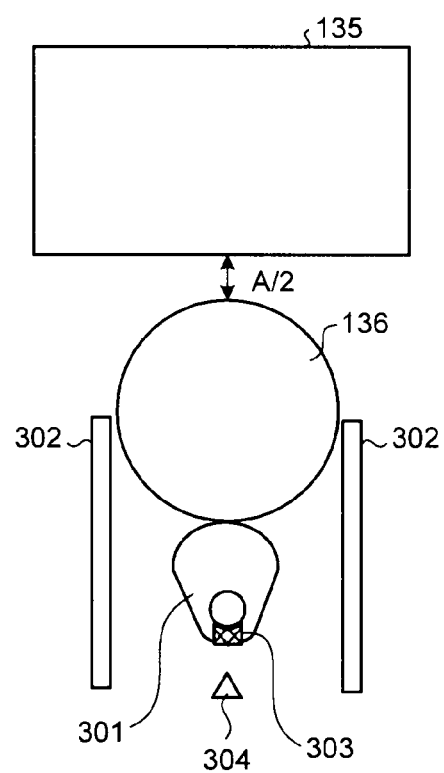

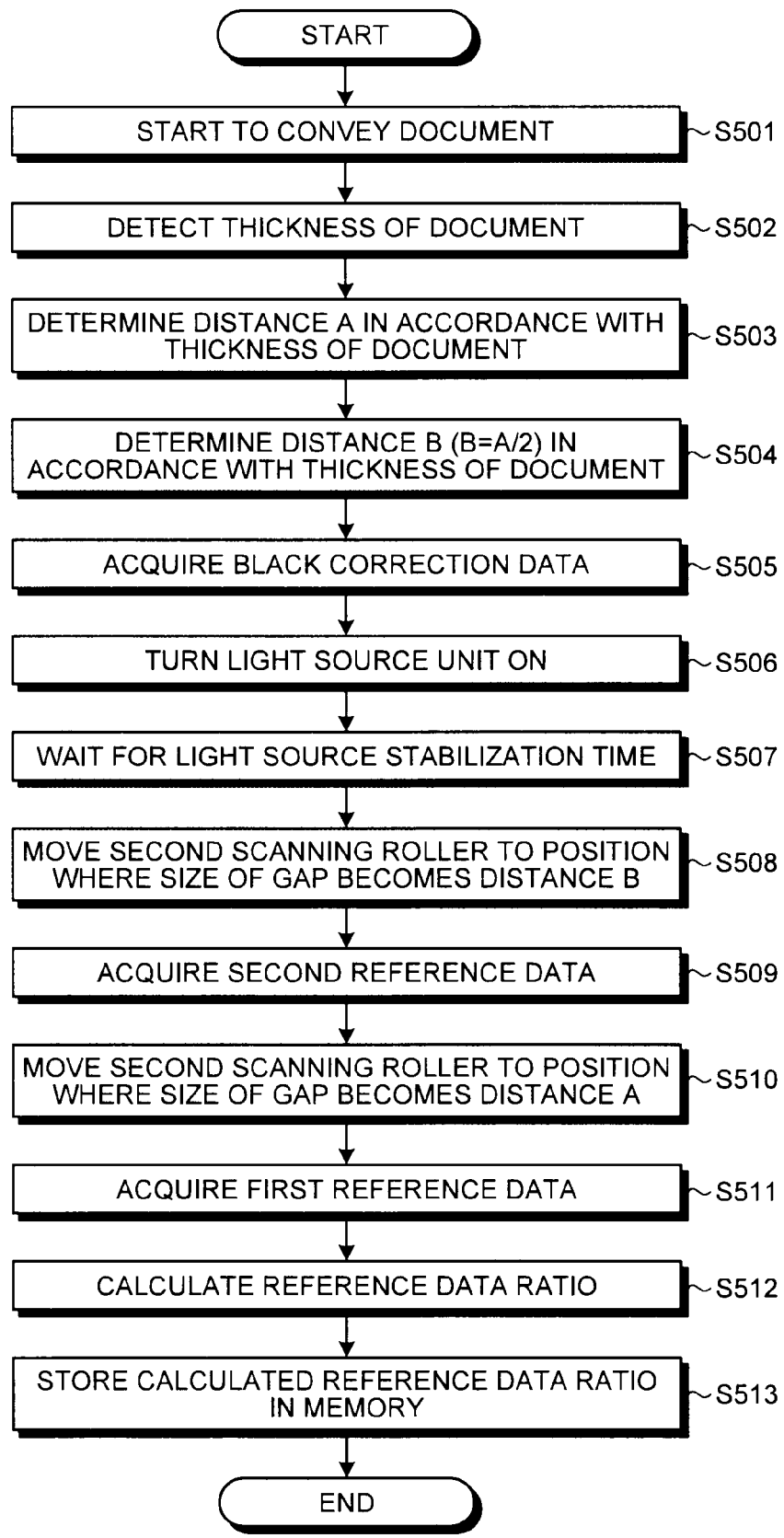

IMAGE READER, IMAGE FORMING APPARATUS, AND METHOD OF CORRECTING IMAGE DATA

CROSS-REFERENCE TO RELATED APPLICATIONS

The present application claims priority to and incorporates by reference the entire contents of Japanese Patent Application No. 2010-162296 filed in Japan on Jul. 16, 2010.

BACKGROUND OF THE INVENTION

1. Field of the Invention

The present invention relates to an image reader, an image forming apparatus, and a method of correcting image data.

2. Description of the Related Art

In the related art, as a reader of a copying machine or a facsimile, a scanner for computer input, or the like, an image reader is used which automatically reads image information of a document. In this type of image reader, light is irradiated onto the document using a light source installed to extend in a main scanning direction perpendicular to the conveying path of the document, and reflected light from the irradiated document is received by an image sensor. In this manner, an image on the document is read. In recent years, for the purpose of reducing the size of the apparatus, the following image reader comes into practical use. That is, in the image reader, a light-emitting diode (LED) having a small shape is used as a light source, and included therein is a contact image sensor (CIS) type scanning unit configured to form an image on a linear image sensor through an optical system of an unmagnification imaging system.

Image data read by the image reader includes irregularity of the light source and sensor sensitivity irregularity. For this reason, shading correction is executed to eliminate the influence of the irregularity of the light source or the irregularity of the sensor sensitivity using data (shading data) obtained by scanning a predetermined reference surface by the scanning unit. Shading correction is generally carried out by the calculation of the following expression.

$$Dout=(Din-Bk)/(Dsh-Bk)\times(2^n-1)$$

Dout: output image data after shading correction
Din: image data obtained when the document is scanned
Dsh: image data (shading data) obtained when the reference surface is scanned
Bk: black level (image data level when light is not input)

An image reader is already known which includes a white member arranged to face the scanning surface of the scanning unit and scans the surface of the white member by the scanning unit during a period other than a document scanning period with the surface of the white member as a reference surface, thereby generating shading data (for example, see Japanese Patent Application Laid-open No. 2005-328156 or the like).

On the other hand, in the optical system of the unmagnification imaging system, the optical path is short and the degree of condensing of light from the light source is high. For this reason, the amount of change in the output level increases with change in the distance between the scanning unit and the document surface (hereinafter, the amount of change in the output level with the change in the distance between the scanning unit and the document surface is defined as an illumination depth characteristic). Meanwhile, since the reference surface which is used in generating shading data is generally fixed, the distance between the scanning unit and the reference surface is constant. Thus, if the output level changes at a certain position in the main scanning direction due to the influence of the illumination depth characteristic caused by flapping of the document when conveying the document, it is not possible to eliminate the change amount through shading correction. The change in the output level that is continuous in the sub scanning direction causes a problem in that a vertical streak occurs in an image.

In the image reader described in Japanese Patent Application Laid-open No. 2005-328156, in generating shading data, the white member is moved to a position facing the scanning surface of the scanning unit to retract the white member during the document scanning period. For this reason, it is considered that the size of a space (hereinafter, referred to as a gap) between the scanning surface of the scanning unit and the white member when the white member is moved to the position facing the scanning surface of the scanning unit is set to be smaller than the size of the gap (that is, the range in which the document is flapped) when the document is scanned, such that it is possible to reduce the influence of the illumination depth characteristic through shading correction.

The image reader described in Japanese Patent Application Laid-open No. 2005-328156, for example, in reading continuous documents, it is necessary to generate shading data by repeatedly moving the white member to the position facing the scanning surface of the scanning unit. There is a novel problem in that it takes a lot of time to move the white member, resulting in degradation in productivity (the number of sheets to be read for a predetermined time).

SUMMARY OF THE INVENTION

It is an object of the present invention to at least partially solve the problems in the conventional technology.

According to an aspect of the present invention, there is provided an image reader including: a scanning unit that scans a document by a contact image sensor system; a white member that is arranged to face the scanning surface of the scanning unit; a gap variable unit that moves at least one of the scanning unit and the white member to change the size of a gap as a space between the scanning surface of the scanning unit and the white member; a reference data ratio storage unit that stores a reference data ratio as the ratio between first reference data acquired by scanning the surface of the white member by the scanning unit in a state where the size of the gap is substantially equal to that when the document is scanned and second reference data acquired by scanning the surface of the white member by the scanning unit in a state where the size of the gap is smaller than that when the document is scanned; a shading data generation unit that causes the scanning unit to scan the surface of the white member in a state where the size of the gap is substantially equal to that when the document is scanned to acquire third reference data and multiplies the third reference data by the reference data ratio to generate shading data; and a shading correction unit that corrects image data of the document scanned by the scanning unit using the generated shading data.

According to another aspect of the present invention, there is provided an image forming apparatus including an image reader and an image forming unit, wherein the image reader includes: a scanning unit that scans a document by a contact image sensor system; a white member that is arranged to face the scanning surface of the scanning unit; a gap variable unit that moves at least one of the scanning unit and the white member to change the size of a gap as a space between the scanning surface of the scanning unit and the white member; a reference data ratio storage unit that stores a reference data ratio as the ratio between first reference data acquired by scanning the surface of the white member by the scanning unit in a state where the size of the gap is substantially equal to that when the document is scanned and second reference data acquired by scanning the surface of the white member by the scanning unit in a state where the size of the gap is smaller than that when the document is scanned; a shading data generation unit that causes the scanning unit to scan the surface of the white member in a state where the size of the gap is substantially equal to that when the document is scanned to acquire third reference data and multiplies third reference data by the reference data ratio to generate shading data; and a shading correction unit that corrects image data of the document scanned by the scanning unit using the generated shading data, and the image forming unit carries out image formation on the basis of image data output from the image reader.

According to still another aspect of the present invention, there is provided a method of correcting image data, performed by an image reader, wherein the image reader includes: a scanning unit which scans a document by a contact image sensor system; a white member that is arranged to face the scanning surface of the scanning unit; a gap variable unit which moves at least one of the scanning unit and the white member to change the size of a gap as a space between the scanning surface of the scanning unit and the white member; a reference data ratio calculation unit; a reference data ratio storage unit; a shading data generation unit; and a shading correction unit, and the method including: causing, by the reference data ratio calculation unit, the scanning unit to scan the surface of the white member in a state where the size of the gap is substantially equal to that when the document is scanned to acquire first reference data; causing, by the reference data ratio calculation unit, the scanning unit to scan the surface of the white member in a state where the size of the gap is smaller than that when the document is scanned to acquire second reference data; calculating, by the reference data ratio calculation unit, a reference data ratio as the ratio between the first reference data and the second reference data; storing, by the reference data ratio storage unit, the calculated reference data ratio; causing, by the shading data generation unit, the scanning unit to scan the surface of the white member in a state where the size of the gap is substantially equal to that when the document is scanned to acquire third reference data and multiplying the third reference data by the reference data ratio to generate shading data; and correcting, by the shading correction unit, image data of the document scanned by the scanning unit using the generated shading data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating a fluctuation in an illumination depth characteristic;

FIGS. 9A and 9B are diagrams showing an example of a mechanism which moves a second scanning roller so as to be close to and distant from the reading surface of the second image reading unit;

FIG. 17 is a flowchart showing calculation processing of a reference data ratio in a fourth example.

DETAILED DESCRIPTION OF THE PREFERRED EMBODIMENTS

Hereinafter, an exemplary embodiment of an image reader, an image forming apparatus, and a method of correcting image data according to the invention will be described in detail with reference to the accompanying drawings. Although in the following embodiment, an example will be described where the invention is applied to a copying machine, the invention is not limited to the following form and may be carried out in various forms without departing from the spirit of the invention.

Configuration of Copying Machine

Figure 1:
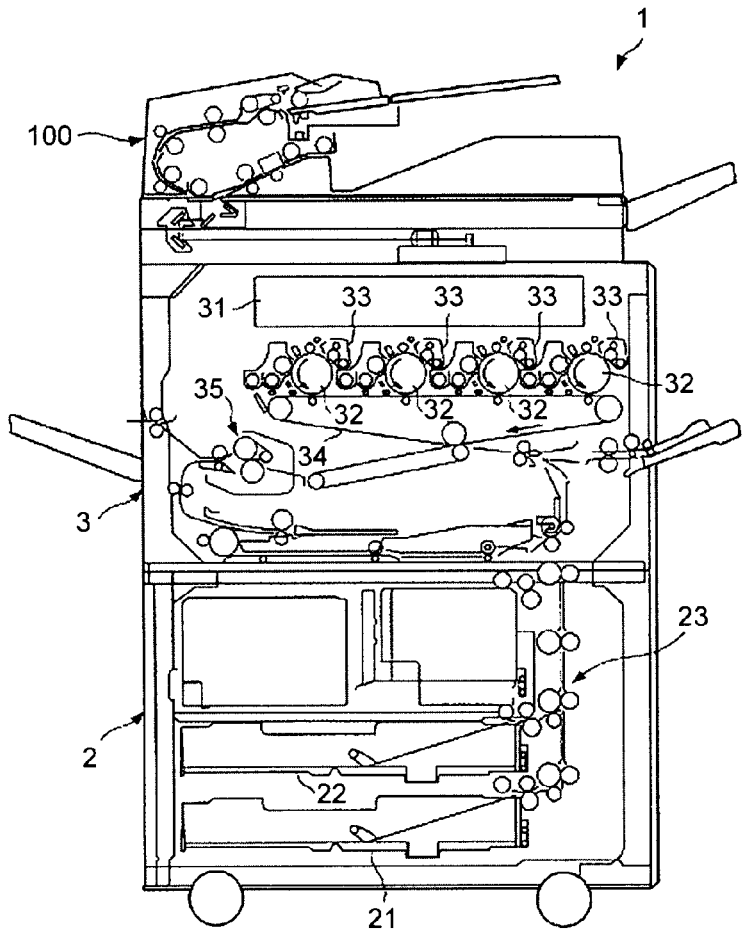
FIG. 1 is a configuration diagram showing the schematic configuration of a copying machine according to an embodiment.

FIG. 1 is a configuration diagram showing the schematic configuration of a copying machine 1 according to this embodiment. As shown in FIG. 1, the copying machine 1 includes an automatic document feeder (ADF) 100 which has a function as an image reader, a sheet feeding unit 2, and an image forming unit 3.

The sheet feeding unit 2 has sheet cassettes 21 and 22 which accommodate recording sheets of different sheet sizes, and a feed unit 23 which conveys the recording sheets accommodated in the sheet cassettes 21 and 22 to the image forming position of the image forming unit 3.

The image forming unit 3 includes an exposure unit 31, a photosensitive element 32, a developing unit 33, a transfer belt 34, and a fixing unit 35. In the image forming unit 3, the exposure unit 31 exposes the photosensitive element 32 on the basis of image data of the document read by an image reading unit in the ADF 100 to form a latent image on the photosensitive element 32, and the developing unit 33 supplies toner of different colors to the photosensitive element 32 to develop the latent image. In the image forming unit 3, the transfer belt 34 transfers the image developed on the photosensitive element 32 to a recording sheet fed from the sheet feeding unit 2, and the fixing unit 35 melts toner of the toner image transferred to the recording sheet to fix a color image to the recording sheet.

Figure 2:
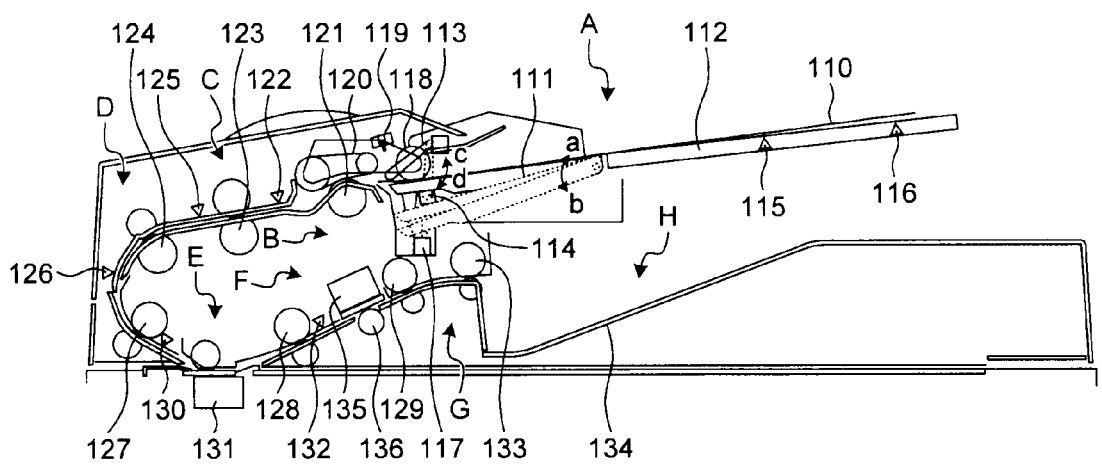
FIG. 2 is a configuration diagram showing the detailed configuration of an ADF in a copying machine.
Figure 3:
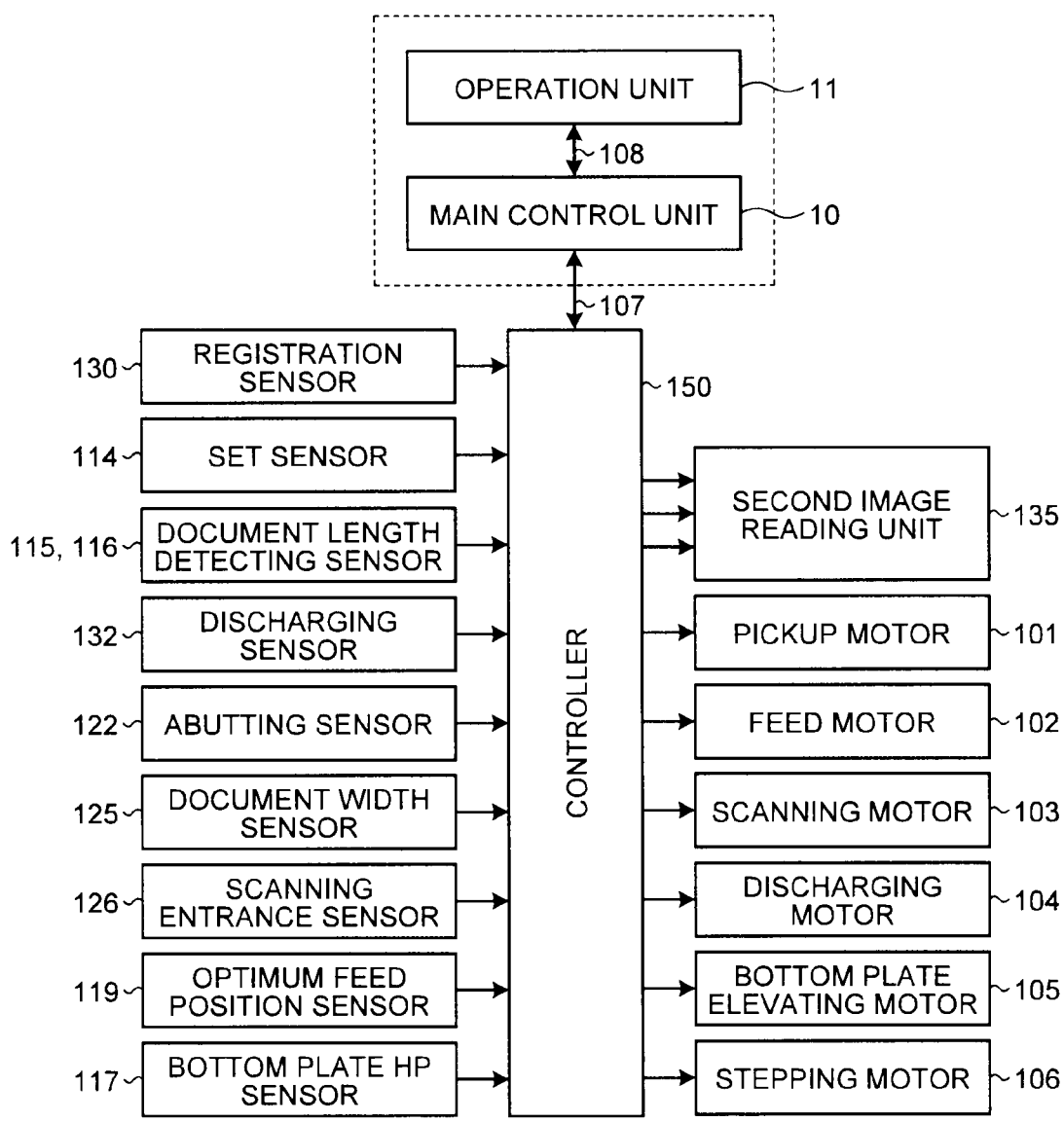
FIG. 3 is a block diagram of a control system of an ADF.

FIG. 2 is a configuration diagram showing the detailed configuration of the ADF 100. FIG. 3 is a block diagram of a control system of the ADF 100. As shown in FIG. 2, the ADF 100 includes a document set section A where a document bundle 110 is set, a separating and feeding section B which separates and feeds the document from the set document bundle 110 sheet by sheet, a registration section C which primarily abuts on and aligns the fed document, and draws and conveys the document after alignment, a turn section D which turns the document to be conveyed and conveys the document in a state where the document surface turns toward the scanning side (the lower side of the drawing) by a first image reading unit 131, a first scan conveying section E which reads the front image of the document from the underside of the contact glass by the first image reading unit 131, a second scan conveying section F which reads the rear image of the document by a second image reading unit 135 after the front image is read, a discharging section G which discharges the document whose front and rear images have been read, and a stack section H which stacks and holds the discharged document.

As shown in FIG. 3, the ADF 100 includes motors 101 to 106 which drive the respective sections, and a controller 150 which controls a sequence of operations. The controller 150 is connected to a main control unit 10, which performs overall control of the copying machine 1, through an I/F 107. An operation unit 11 on which a user carries out various operations is connected to the main control unit 10 through an I/F 108.

In the document set section A, the document bundle 110 to be read is set. The document bundle 110 is set on a document table 112 which includes a movable document table 111. The document bundle 110 is set on the document table 112 in a state where the document surface faces up. At this time, the width direction of the document bundle 110 is set by side guides (not shown) to a direction perpendicular to a conveying direction. The setting of the document bundle 110 is detected by a set filler 113 and a set sensor 114, and information indicating that the document bundle 110 is set is transmitted from the controller 150 to the main control unit 10 through the I/F 107.

The outline of the length of the document bundle 110 in the conveying direction of the document is determined by document length detecting sensors 115 and 116 provided in the document table surface. As the document length detecting sensors 115 and 116, for example, use is made of a reflection-type sensor or an actuator-type sensor which is capable of detecting even a single sheet of document. It is necessary to arrange the document length detecting sensors 115 and 116 so as to be able to determine at least the height or width of the same document.

The movable document table 111 is configured to move up and down, that is, in directions "a" and "b" of FIG. 2, by the bottom plate elevating motor 105. When the document bundle 110 is not set on the document table 112, the movable document table 111 is in a state of being moved down, and this state is detected by a bottom plate HP sensor 117. If the set filler 113 and the set sensor 114 detect that document bundle 110 is set on the document table 112, the controller 150 normally rotates the bottom plate elevating motor 105 to elevate the movable document table 111 such that the uppermost surface of the document bundle 110 comes into contact with a pickup roller 118 of the separating and feeding section B. The pickup roller 118 operates in directions "c" and "d" of FIG. 2 by the action of a cam mechanism by the pickup motor 101, and the movable document table 111 moves up, is pressed from the top surface of the document bundle 110 on the movable document table 111, and moves up in the direction "c" of FIG. 2, such that the upper limit can be detected by an optimum feed position sensor 119.

If the user depresses a print key of the operation unit 11, and a document feed signal is transmitted from the main control unit 10 to the controller 150 through the I/F 107, the pickup roller 118 is driven to rotate by the normal rotation of the feed motor 102 and picks up several sheets (ideally, one sheet) of document on the document table 112. The rotation direction is the same as the direction of conveying the top document to a feeding port.

A sheet feeding belt 120 is driven in a feeding direction by the normal rotation of the feed motor 102. A reverse roller 121 is driven to rotate in a direction opposite to the feeding direction by the normal rotation of the feed motor 102. Thus, the uppermost document and the underlying document can be separated, and only the uppermost document can be fed. To be more specific, the reverse roller 121 comes into contact with the sheet feeding belt 120 at a predetermined pressure, and in a state where the reverse roller 121 comes into contact with the sheet feeding belt 120 directly or through one sheet of document, and co-rotates in a counterclockwise direction with the rotation of the sheet feeding belt 120. Meanwhile, when two or more sheets of document enter between the sheet feeding belt 120 and the reverse roller 121, the co-rotation force is set to be smaller than torque of a torque limiter, and the reverse roller 121 rotates in a clockwise direction, which is an original driving direction, to push the excess document back. Thus, double feeding of the document is prevented.

The document which is separated sheet by sheet through the action of the sheet feeding belt 120 and the reverse roller 121 is fed toward the registration section C by the sheet feeding belt 120, after the leading end of the document is detected by an abutting sensor 122, is further advanced to abut on a pullout roller 123 being stopped. Thereafter, the document is fed by a predetermined amount of distance since the detection of the abutting sensor 122, and the feed motor 102 stops in a state where the document is pressed against the pullout roller 123 with a predetermined amount of bending, such that the driving of the sheet feeding belt 120 stops. At this time, the pickup motor 101 rotates to retract the pickup roller 118 from the top surface of the document, and the document is fed only by the conveying force of the sheet feeding belt 120. Thus, the leading end of the document enters the nip of a pair of upper and lower rollers of the pullout roller 123, and the alignment of the leading end (skew correction) is carried out.

The pullout roller 123 is a roller which has the above-described skew correction function, and conveys the document subjected to skew correction after separated to a intermediate roller 124. The pullout roller 123 is driven by reverse rotation of the feed motor 102. At the time of the reverse rotation of the feed motor 102, the pullout roller 123 and the intermediate roller 124 are driven, but the pickup roller 118 and the sheet feeding belt 120 are not driven.

A plurality of document width sensors 125 are arranged in a depth direction of FIG. 2 to detect the size of the document conveyed by the pullout roller 123 in the width direction perpendicular to the conveying direction. The length of the document in the conveying direction is detected from motor pulses by reading the leading end and the trailing end of the document with the abutting sensor 122.

When the document is conveyed from the registration section C to the turn section D by driving of the pullout roller 123 and the intermediate roller 124, a conveying speed in the registration section C is set to be higher than a conveying speed in the first scan conveying section E, thereby reducing the processing time of conveying the document to the image reading unit. If the leading end of the document is detected by a scanning entrance sensor 126, before the leading end of the document enters the nip of a pair of upper and lower rollers of a scanning entrance roller 127, speed reduction starts to equalize the document conveying speed and a scan conveying speed, and the scanning motor 103 is driven to normally rotate to drive the scanning entrance roller 127, a scanning exit roller 128, and a CIS exit roller 129. If the leading end of the document is detected by a registration sensor 130, the controller 150 reduces the conveying speed of the document for a predetermined conveying distance, temporarily stops the document just before the first image reading unit 131, and transmits a registration stop signal to the main control unit 10 through the I/F 107.

Subsequently, if a scanning start signal is transmitted from the main control unit 10 to the controller 150 through the I/F 107, the controller 150 conveys the document stopping for registration at the speed increasing up to a predetermined speed until the leading end of the document reaches the position of the first image reading unit 131. At this time, at the timing at which the position of the leading end of the document is detected by counting the number of pulses of the scanning motor 103, and the leading end of the document reaches the first image reading unit 131; a gate signal indicating an effective image region of the front surface of the document in the sub scanning direction (the same as the conveying direction of the document) is transmitted to the main control unit 10. The gate signal is continuously transmitted until the trailing end of the document exits from the first image reading unit 131. While the document is being conveyed by driving of the scanning entrance roller 127 and the scanning exit roller 128, the front image of the document is read by the first image reading unit 131.

In the case of reading an single-sided document, the document whose front image has been read by the first image reading unit 131 of the first scan conveying section E passes through the second scan conveying section F as it is and is conveyed to the discharging section G. At this time, if the leading end of the document is detected by a discharging sensor 132, the controller 150 drives the discharging motor 104 to normally rotate so as to rotate a discharging roller 133 in the counterclockwise direction. The controller 150 reduces the driving speed of the discharging motor immediately before the trailing end of the document exits from the nip of a pair of upper and lower rollers of the discharging roller 133 by counting the number of pulses of the discharging motor 104 from the detection of the leading end of the document by the discharging sensor 132, and performs control such that the document which is discharged onto a discharge tray 134 of the stack section H does not jump out.

Meanwhile, in the case of reading a double-sided document, at the timing at which the position of the leading end of the document being conveyed is detected by counting the number of pulses of the scanning motor 103 after the leading end of the document is detected by the discharging sensor 132, and the leading end of the document reaches the position of the second image reading unit 135 of the second scan conveying section F; a gate signal indicating an effective image region of the rear surface of the document in the sub scanning direction is transmitted from the controller 150 to the second image reading unit 135. The gate signal is continuously transmitted until the trailing end of the document exits from the second image reading unit 135. While the document is being conveyed by driving of the scanning exit roller 128 and the CIS exit roller 129, the rear image of the document is read by the second image reading unit 135 using a document skimming method (sheet-through scanning).

A second scanning roller 136 which is arranged to face the second image reading unit 135 suppresses uplift of the document in the second image reading unit 135, and also serves as a reference white section which acquires shading data in the second image reading unit 135. That is, the second scanning roller 136 corresponds to a white member. The second scanning roller 136 is movable in a direction getting closer to or away from the reading surface of the second image reading unit 135 by driving of the stepping motor 106. With the movement of the second scanning roller 136, the size of a gap which is a space between the reading surface of the second image reading unit 135 and the second scanning roller 136 becomes variable.

In the copying machine 1 of this embodiment, the second image reading unit 135 of the above-described ADF 100 is configured as a scanning unit which scans a document using a CIS method. Hereinafter, the configuration of the second image reading unit 135 and a control system relating to the second image reading unit 135 will be described in detail.

Figure 4:
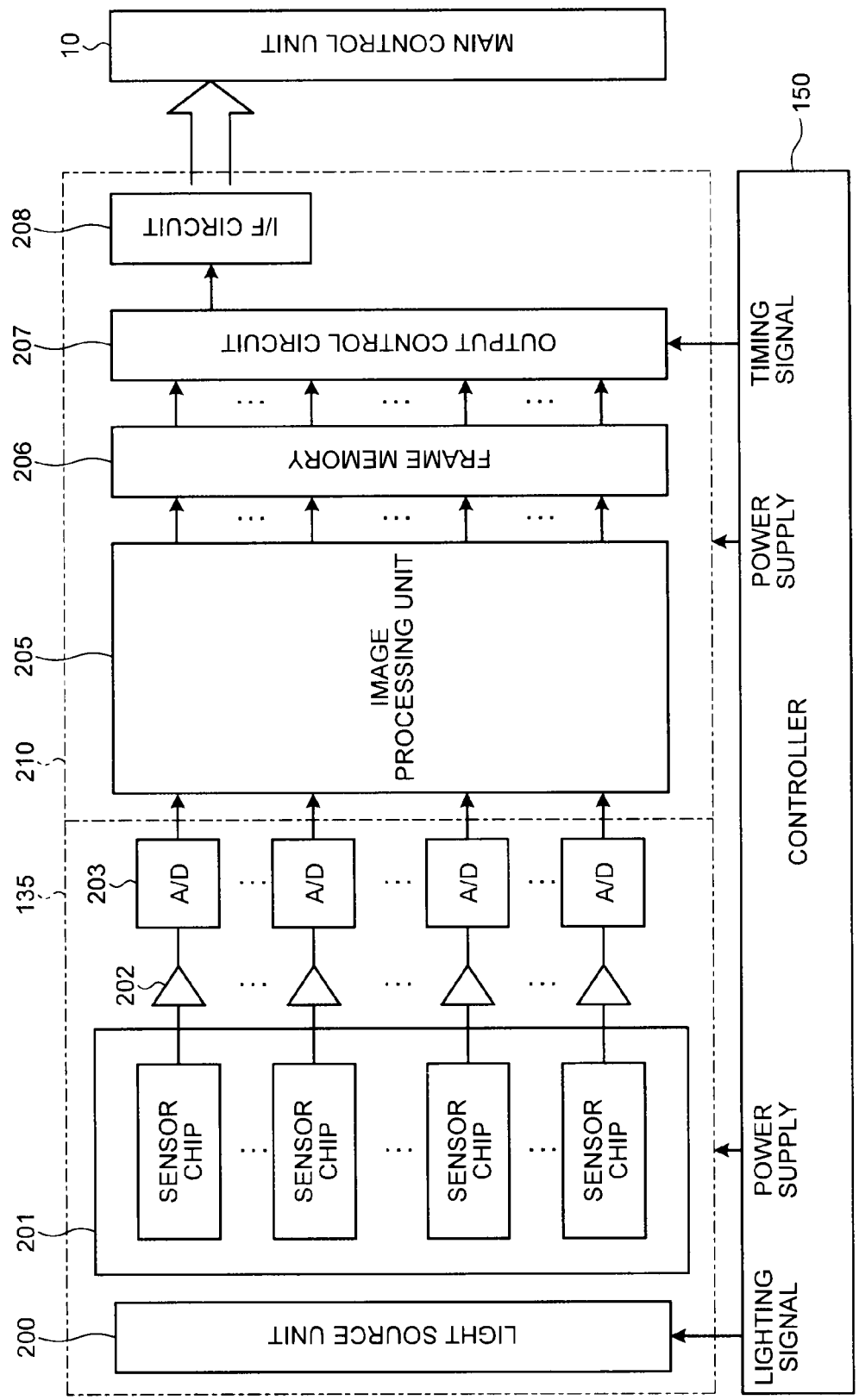
FIG. 4 is a diagram illustrating a main part of an electrical circuit relating to a second image reading unit of an ADF.

FIG. 4 is a diagram illustrating a main part of an electrical circuit relating to the second image reading unit 135. As shown in FIG. 4, the second image reading unit 135 includes a light source unit 200 which is constituted by an LED array or the like, a linear image sensor 201 in which a plurality of sensor chips are arranged in the main scanning direction (the direction corresponding to the document width direction), a plurality of amplifier circuits 202 which are respectively connected to the sensor chips of the linear image sensor 201, and a plurality of A/D converters 203 which are respectively connected to the amplifier circuits 202. Each sensor chip in the linear image sensor 201 is a sensor chip which is called an unmagnification contact image sensor, and includes a condensing lens and a plurality of photoelectric conversion elements arranged linearly in the main scanning direction to correspond to pixels.

The output of the second image reading unit 135 is connected to a digital signal processing unit 210. The digital signal processing unit 210 includes an image processing unit 205 which receives the output signals of the A/D converters 203 to generate image data of the document scanned by the linear image sensor 201, a frame memory 206 which stores image data generated by the image processing unit 205 frame by frame, and an output control circuit 207 which controls output of image data, and an I/F circuit 208.

In the ADF 100, before the document enters the reading position of the second image reading unit 135 (the position facing the reading surface of the second image reading unit 135), a lighting signal is sent from the controller 150 to the light source unit 200 to turn the light source unit 200 on. Thus, the light source unit 200 is turned on to irradiate light onto the document which enters the reading position of the second image reading unit 135 (the position facing the reading surface). Reflected light from the document is condensed on the photoelectric conversion element by the condensing lens in each sensor chip of the linear image sensor 201 and read as image information. A signal of an image read by each sensor chip of the linear image sensor 201 is amplified by the amplifier circuit 202 and converted into digital data by the A/D converter 203.

Digital data output from the A/D converter 203 is input to the image processing unit 205. The image processing unit 205 executes black level correction, shading correction, or the like on input digital data, generates image data of the document using processed data, and temporarily stores the generated image data in the frame memory 206. In the ADF 100, in order to execute shading correction in the image processing unit 205, processing is performed for reading an image of the surface (reference surface) of the second scanning roller (white member) 136 by the second image reading unit 135 to generate shading data. The shading data generation processing will be described below in detail.

Thereafter, image data of the document stored in the frame memory 206 is converted in a data format, which can be received by the main control unit 10, by the output control circuit 207, and output to the main control unit 10 through the I/F circuit 208. The operation of the second image reading unit 135 or the digital signal processing unit 210 is overall controlled by the controller 150. For example, the controller 150 outputs a timing signal for informing of the timing at which the leading end of the document reaches the reading position of the second image reading unit 135 (image data after that timing is handled as effective data), a lighting signal of the light source unit 200, or the like to control the operation of the second image reading unit 135 or the digital signal processing unit 210. Power supply to the second image reading unit 135 or the digital signal processing unit 210 is carried out under the control of the controller 150.

On the other hand, when the image of the document is read by the second image reading unit 135, reading is carried out while the document is conveyed to the gap between the reading surface of the second image reading unit 135 and the second scanning roller 136. For this reason, it is necessary to secure the size of the gap such that a document having a maximum thickness corresponding to the ADF 100 can appropriately pass through the gap. Thus, there is room in the size of the gap with respect to the thickness of many sheets of document, such that there is a possibility that flapping occurs in the document passing through the gap.

As described above, the second image reading unit 135 is a CIS type scanning unit using an optical system of an unmagnification imaging system. For this reason, the second image reading unit 135 is susceptible to the influence of the illumination depth characteristic due to flapping of the document at the time of conveying the document. If the output level changes at a certain position in the main scanning direction due to the influence of the illumination depth characteristic, it is not possible to eliminate the change amount through shading correction, and the change in the output level is continuous in the sub scanning direction, resulting in a vertical streak in the image.

Figure 5:
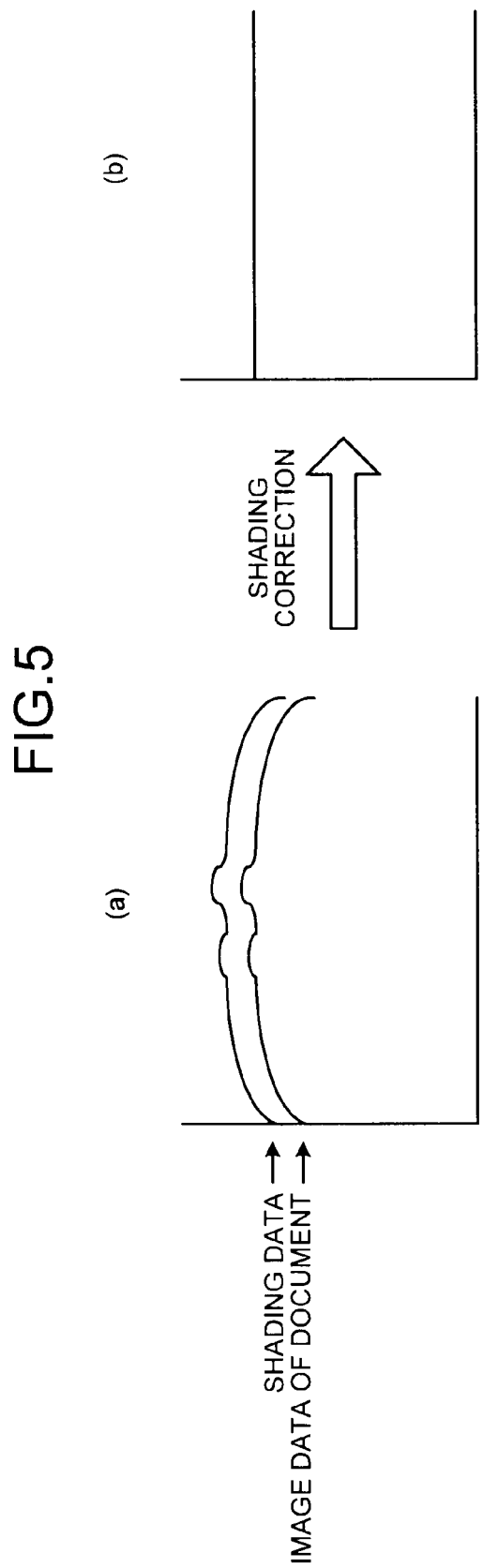
FIG. 5 is a diagram illustrating a reason for a vertical streak in an image.
Figure 6:
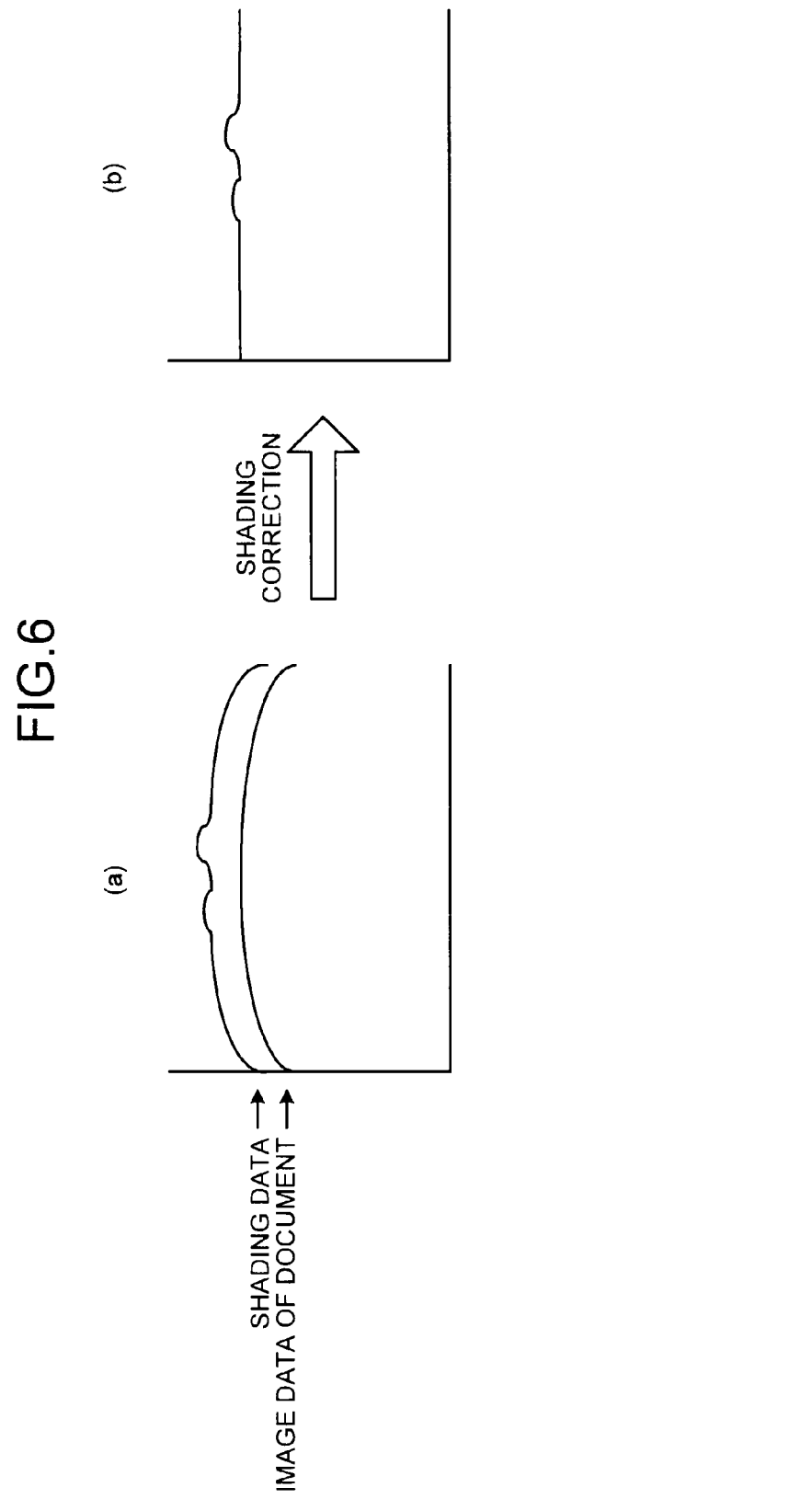
FIG. 6 is a diagram illustrating a reason for a vertical streak in an image.

While a case will be illustrated where a document having uniform density is scanned, a reason for a vertical streak in an image will be described in detail. FIGS. 5 and 6 are diagrams illustrating a reason for a vertical streak in an image. FIGS. 5 and 6 show the distribution of the output level in the main scanning direction when an image of a document having uniform density is read by the second image reading unit 135 as image data of the document, and the distribution of the output level in the main scanning direction when an image of the surface of the second scanning roller 136 is read by the second image reading unit 135 as shading data.

When shading data is Dsh and image data of the document is Din, if shading correction is executed in accordance with the arithmetic expression, and as shown in FIG. 5(*a*), Dsh and Din have the same output ratio at all the pixel positions in the main scanning direction, as shown in FIG. 5(*b*), flat image data is output after shading correction.

Meanwhile, as shown in FIG. 6(*a*), when the illumination depth characteristic fluctuates depending on the position in the main scanning direction, and Dsh and Din are different in the output ratio, as shown in FIG. 6(*b*), even when an image of a document having uniform density is read, image data after shading correction does not become flat. Since this state is continuous in the sub scanning direction, a vertical streak occurs in an image.

Figure 7:
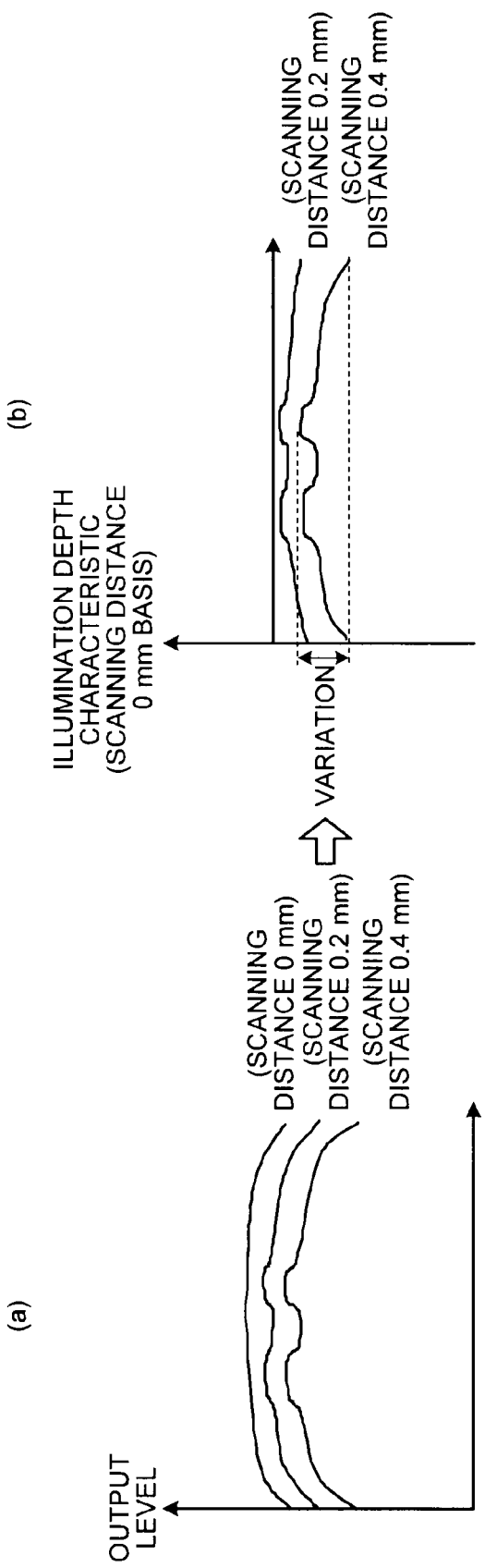
FIG. 7 is a diagram showing a relationship between an illumination depth characteristic and a scanning distance.

In general, with regard to the illumination depth characteristic, there is a tendency that, as the distance from the scanning surface of the scanning unit (hereinafter, referred to as a scanning distance) increases, the fluctuation increases. FIG. 7 is a diagram showing the relationship between the illumination depth characteristic and the scanning distance. FIG. 7(*a*) shows the distribution of the output level in the main scanning direction when the scanning distance is 0 mm, 0.2 mm, and 0.4 mm. FIG. 7(*b*) shows the illumination depth characteristic in the case of the scanning distance of 0.2 mm and the illumination depth characteristic in the case of the scanning distance of 0.4 mm on the basis of the scanning distance of 0 mm. In comparison of the illumination depth characteristic in the case of the scanning distance of 0.2 mm and the illumination depth characteristic in the case of the scanning distance of 0.4 mm of FIG. 7(*b*), it is understood that the illumination depth characteristic in the case of the scanning distance of 0.4 mm undergoes large fluctuation.

In order to suppress fluctuation of the illumination depth characteristics between shading data and image data of the document and to suppress the influence of the illumination depth characteristic in image data of the document by shading correction, it is necessary to reduce the difference between the scanning distance (the distance between the reading surface of the second image reading unit 135 and the second scanning roller 136) when shading data is generated and scanning distance (the distance between the reading surface of the second image reading unit 135 and the document) when the image of the document is read.

FIG. 8, if the distance between the reading surface of the second image reading unit 135 and the second scanning roller 136 (the size of the gap) when the image of the document is read is A, and the scanning distance when the image of the document is read is B, the scanning distance B when the image of the document is read is 0 mm as a minimum value (when the document is conveyed along the reading surface of the second image reading unit 135) and the distance A as a maximum value (when the document is conveyed along the second scanning roller 136). Thus, if the scanning distance when shading data is generated is A, the difference between the scanning distance when shading data is generated and the scanning distance B when the image of the document is read becomes the distance A as a maximum value (when the document is conveyed along the reading surface of the second image reading unit 135), and the illumination depth characteristic changes at the distance A.

Meanwhile, the scanning distance when shading data is generated is smaller than A, that is, smaller than the size of the gap when the image of the document is read, for example, A/2, the difference between the scanning distance when shading data is generated and the scanning distance B when the image of the document is read becomes the distance A/2 as the maximum value (when the document is conveyed along the reading surface of the second image reading unit 135 or the second scanning roller 136), and the illumination depth characteristic changes at the distance ±A/2. At this time, since the difference between the scanning distance when shading data is generated and the scanning distance when the image of the document is read can be minimized, it is possible to minimize the influence of fluctuation of the illumination depth characteristic.

As described above, from the viewpoint of suppressing the influence of fluctuation of the illumination depth characteristic by shading correction, it is effective that the size of the gap when shading data is generated is smaller than the size of the gap when the image of the document is read (preferably, ½). In the ADF 100 of this embodiment, as described above, the second scanning roller 136 is movable in a direction getting closer to or away from the reading surface of the second image reading unit 135 by driving of the stepping motor 106. Therefore, if the second scanning roller 136 when shading data is generated is close to the reading surface of the second image reading unit 135, the size of the gap when shading data is read can be made smaller than the size of the gap when the image of the document is read.

However, in executing optimum shading correction in consideration of temporal change in the light amount of the light source or the like, it is necessary to generate shading data each time the document is scanned. For this reason, for example, when continuous documents are scanned, such as the execution of a job for scanning a document having a plurality of pages, the movement of the second scanning roller 136 is repeated. There is a new problem in that it takes a lot of time to move the second scanning roller 136, causing degradation in productivity (the number of sheets to be read for a predetermined time).

In the ADF 100 of this embodiment, the ratio of data (first reference data) which is acquired by reading the image of the surface of the second scanning roller 136 by the second image reading unit 135 in a state where the size of the gap between the reading surface of the second image reading unit 135 and the second scanning roller 136 is substantially equal to that when the image of the document is read and data (second reference data) which is acquired by reading the image of the surface of the second scanning roller 136 by the second image reading unit 135 in a state where the size of the gap between the reading surface of the second image reading unit 135 and the second scanning roller 136 is smaller than that when the image of the document is read (for example, ½) is calculated as a reference data ratio, and the reference data ratio is stored. In actually generating shading data to correct image data of each document, the stored reference data ratio is multiplied to data (third reference data) which is acquired by reading the image of the surface of the second scanning roller 136 by the second image reading unit 135 in a state where the size of the gap between the reading surface of the second image reading unit 135 and the second scanning roller 136 is substantially equal to that when the image of the document is read, thereby generating shading data. Thus, in generating shading data, while the size of the gap between the reading surface of the second image reading unit 135 and the second scanning roller 136 is substantially equal to that when the image of the document is read without moving the second scanning roller 136, shading data equivalent to that when the size of the gap is reduced is generated, thereby executing shading correction. As a result, it becomes possible to effectively reduce the influence of the illumination depth characteristic by shading correction without causing degradation in productivity.

FIGS. 9A and 9B are diagrams showing an example of a mechanism which moves the second scanning roller 136 in a direction getting closer to or away from the reading surface of the second image reading unit 135. As shown in FIGS. 9A and 9B, a cam 301 is provided at a position near the second scanning roller 136, and the cam 301 rotates by driving of the stepping motor 106 (not shown in FIGS. 9A and 9B), such that the second scanning roller 136 is movable in the direction getting closer to or away from the reading surface of the second image reading unit 135 along guides 302.

A filler 303 is provided at the rotation shaft of the cam 301 so as to control the position of the cam 301. A cam position detecting sensor 304 is provided near the cam 301 so as to detect the filler 303 when the rotation position of the cam 301 is at a position such that the second scanning roller 136 is closest to the reading surface of the second image reading unit 135 (in the example of FIGS. 9A and 9B, A/2).

With the above-described configuration, when the rotation position of the cam 301 is at a position shown in FIG. 9A, the size of the gap between the reading surface of the second image reading unit 135 and the second scanning roller 136 becomes A (the size of the gap when the image of the document is read). The cam 301 is rotated by the stepping motor 106 until the filler 303 is detected by the cam position detecting sensor 304. Thus, the rotation position of the cam 301 is at a position shown in FIG. 9B, such that the size of the gap becomes A/2, thereby changing the size of the gap.

In calculating the reference data ratio, first, the cam 301 rotates by driving of the stepping motor 106 until the filler 303 is detected by the cam position detecting sensor 304, and as shown in FIG. 9B, the size of the gap is set to A/2. In this state, the image of the surface of the second scanning roller 136 is read by the second image reading unit 135 to acquire second reference data. Thereafter, the stepping motor 106 is driven by a predetermined number of steps to rotate the cam 301, such that, as shown in FIG. 9A, the size of the gap is set to A substantially equal to that when the image of the document is read. In this state, the image of the surface of the second scanning roller 136 is read by the second image reading unit 135 to acquire first reference data. Then, the ratio of first reference data and second reference data is calculated and stored as a reference data ratio.

The controller 150 controls the operations of the second image reading unit 135, the digital signal processing unit 210, and the stepping motor 106 to realize the characteristic processing in the ADF 100 of this embodiment described above. Hereinafter, specific examples of the processing will be described as Examples.

FIRST EXAMPLE

First, a first example will be described with reference to FIGS. 10 to 12. In the first example, at the time of executing a job for reading an image of a document having a plurality of pages, reference data ratio is calculated only once at the head of the job.

Figure 10:
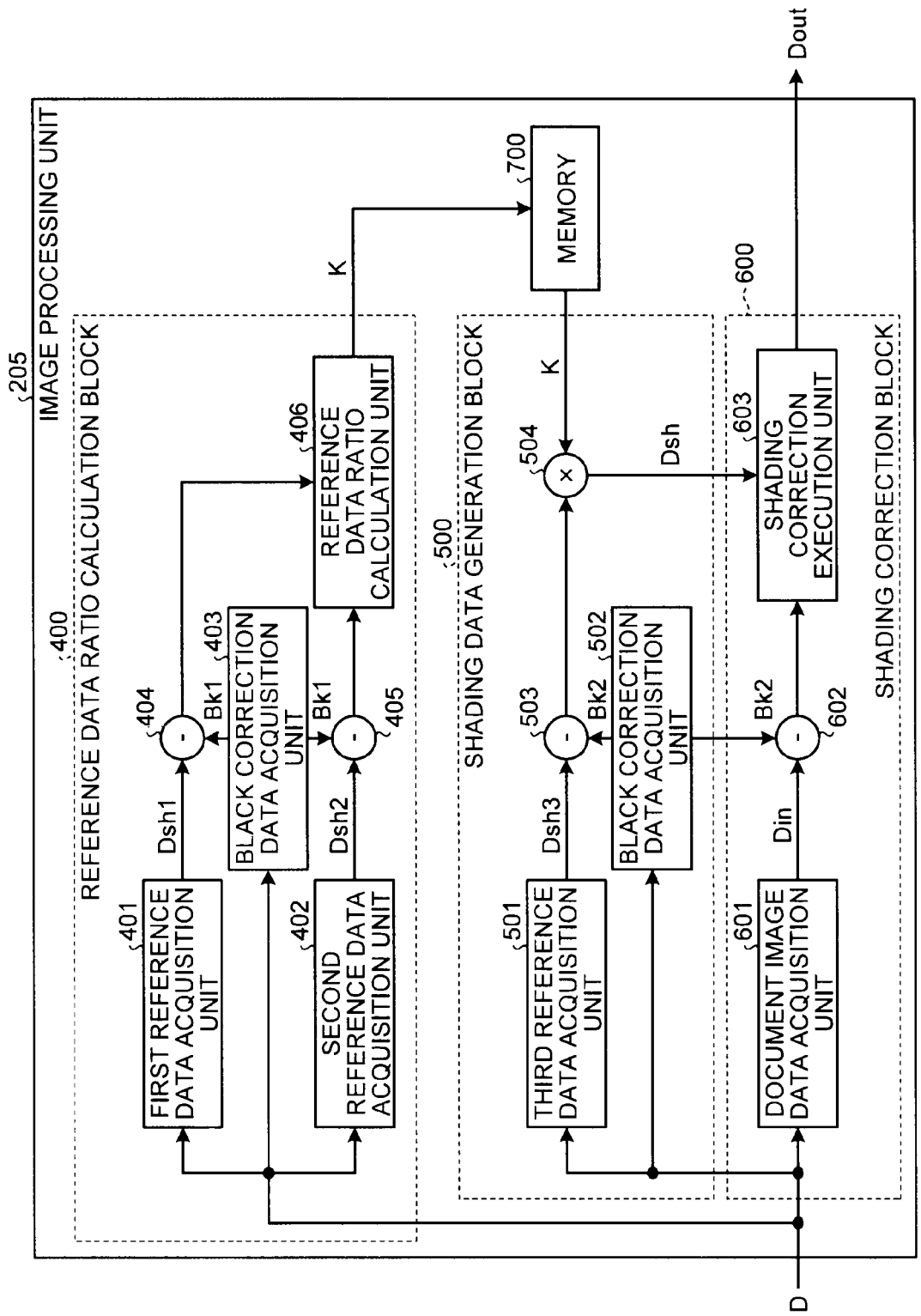
FIG. 10 is a functional block diagram showing the configuration relating to shading correction which is realized in an image processing unit under the control of a controller.

FIG. 10 is a functional block diagram showing the configuration relating to shading correction which is realized in the image processing unit 205 under the control of the controller 150. The functions relating to shading correction which are realized in the image processing unit 205 are divided into a reference data ratio calculation block 400, a shading data generation block 500, a shading correction block 600, and a memory 700. In the drawing, D represents image data which is input from the second image reading unit 135, and Dout represents image data after shading correction.

The reference data ratio calculation block 400 has a first reference data acquisition unit 401, a second reference data acquisition unit 402, a black correction data acquisition unit 403, subtractors 404 and 405, and a reference data ratio calculation unit 406.

The first reference data acquisition unit 401 acquires image data, which is input to the image processing unit 205 when the second image reading unit 135 reads the image of the surface of the second scanning roller 136 in a state where the size of the gap between the reading surface of the second image reading unit 135 and the second scanning roller 136 is substantially equal to that when the image of the document is read, as first reference data Dsh1. The second reference data acquisition unit 402 acquires image data, which is input to the image processing unit 205 when the second image reading unit 135 reads the image of the surface of the second scanning roller 136 in a state where the size of the gap between the reading surface of the second image reading unit 135 and the second scanning roller 136 is smaller than that when the image of the document is read (for example, ½), as second reference data Dsh2. The black correction data acquisition unit 403 acquires image data, which is input to the image processing unit 205 when the reading operation of the second image reading unit 135 is carried out without turning the light source unit 200 on, as black correction data Bk1.

The subtractor 404 subtracts black correction data Bk1 acquired by the black correction data acquisition unit 403 from first reference data Dsh1 acquired by the first reference data acquisition unit 401 to remove a black level offset component other than a signal component from the first reference data Dsh1. First reference data Dsh1 with the black level offset component removed is input to the reference data ratio calculation unit 406. The subtractor 405 subtracts black correction data Bk1 acquired by the black correction data acquisition unit 403 from second reference data Dsh2 acquired by the second reference data acquisition unit 402 to remove a black level offset component other than a signal component from second reference data Dsh2. Second reference data Dsh2 with the black level offset component removed is input to the reference data ratio calculation unit 406.

The reference data ratio calculation unit 406 calculates the ratio of first reference data Dsh1 with the black level offset component removed and second reference data Dsh2 with the black level offset component removed for each effective pixel in the linear image sensor 201 of the second image reading unit 135 and stores the calculation result in the memory 700 as a reference data ratio K.

The shading data generation block 500 has a third reference data acquisition unit 501, a black correction data acquisition unit 502, a subtractor 503, and a multiplier 504.

The third reference data acquisition unit 501 acquires image data, which is input to the image processing unit 205 when the second image reading unit 135 reads the image of the surface of the second scanning roller 136 in a state where the size of the gap between the reading surface of the second image reading unit 135 and the second scanning roller 136 is substantially equal to that when the image of the document is read, as third reference data Dsh3 at the timing of generating shading data. The black correction data acquisition unit 502 acquires image data, which is input to the image processing unit 205 when the reading operation of the second image reading unit 135 is carried out without turning the light source unit 200 on, as black correction data Bk2.

The subtractor 503 subtracts black correction data Bk2 acquired by the black correction data acquisition unit 502 from third reference data Dsh3 acquired by the third reference data acquisition unit 501 to remove a black level offset component other than a signal component from third reference data Dsh3. The multiplier 504 multiplies the reference data ratio K read from the memory 700 to third reference data Dsh3 with the black level offset component removed to generate shading data Dsh.

The shading correction block 600 has a document image data acquisition unit 601, a subtractor 602, and a shading correction execution unit 603.

The document image data acquisition unit 601 acquires image data, which is input to the image processing unit 205 when the second image reading unit 135 reads an image of a document conveyed to the reading position of the second image reading unit 135 (the position facing the reading surface), as document image data Din. The subtractor 602 subtracts black correction data Bk2 acquired by the black correction data acquisition unit 502 from document image data Din acquired by the document image data acquisition unit 601 to remove a black level offset component other than a signal component from document image data Din.

The shading correction execution unit 603 executes shading correction on document image data Din with the black level offset component removed using shading data Dsh generated by the multiplier 504 of the shading data generation block 500.

Figure 11:
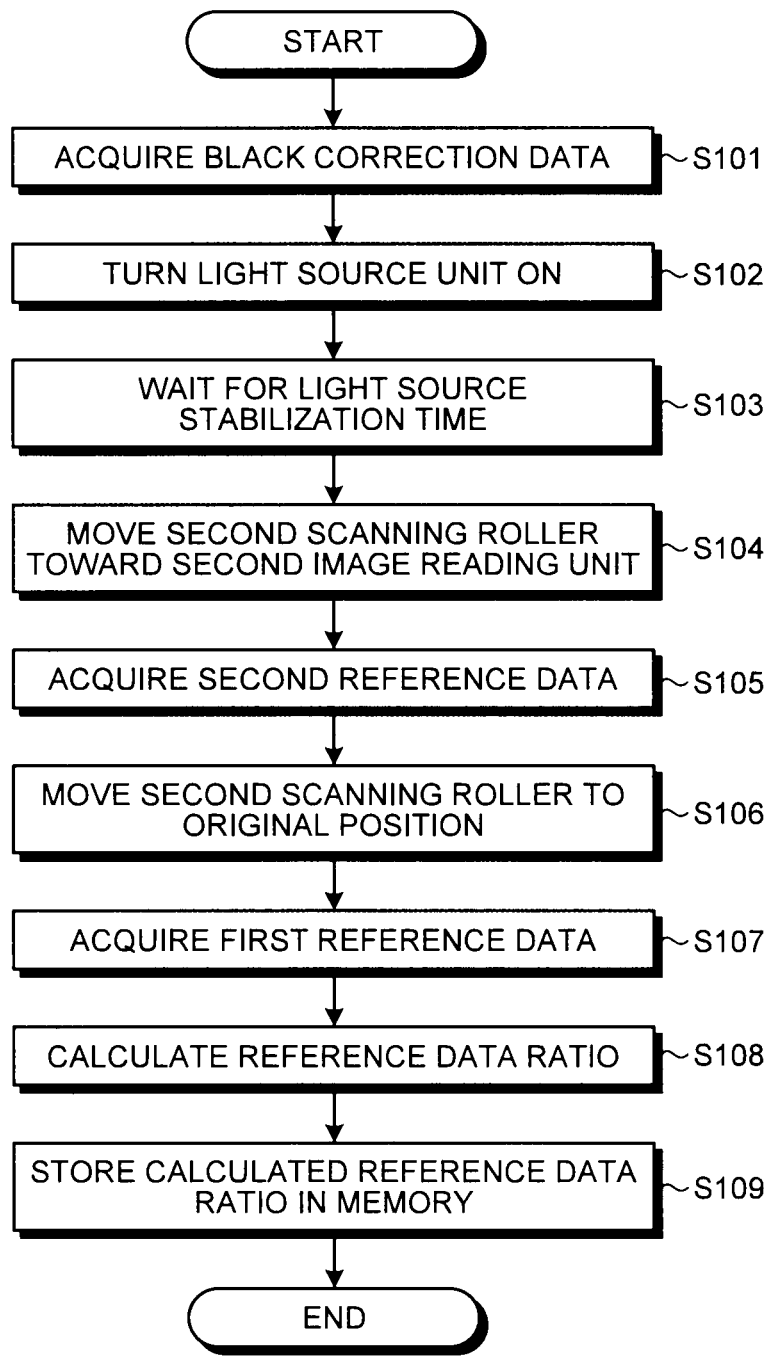
FIG. 11 is a flowchart showing calculation processing of a reference data ratio which is performed under the control of a controller.

FIG. 11 is a flowchart showing calculation processing of a reference data ratio which is performed under the control of the controller 150. In calculating the reference data ratio, first, in Step S101, the reading operation is carried out by the second image reading unit 135 in a state where the light source unit 200 is turned off, and black correction data Bk1 is acquired.

Next, in Step S102, the light source unit 200 is turned on. Thereafter, since it takes time until the light amount is stabilized after the light source unit 200 is turned on, it waits for a light source stabilization time set in advance (Step S103).

Next, in Step S104, the second scanning roller 136 moves in a direction close to the second image reading unit 135 by driving of the stepping motor 106, such that the size of the gap between the reading surface of the second image reading unit 135 and the second scanning roller 136 is smaller than that when the image of the document is read (for example, ½). In Step S105, in a state where the gap between the reading surface of the second image reading unit 135 and the second scanning roller 136 is smaller than that when the image of the document is read, the image of the surface of the second scanning roller 136 is read by the second image reading unit 135, and second reference data Dsh2 is acquired.

Next, in Step S106, the second scanning roller 136 moves to the original position by driving of the stepping motor 106, and the size of the gap between the reading surface of the second image reading unit 135 and the second scanning roller 136 is substantially equal to that when the image of the document is read. In Step S107, in a state where the gap between the reading surface of the second image reading unit 135 and the second scanning roller 136 is substantially equal to that when the image of the document is read, the image of the surface of the second scanning roller 136 is read by the second image reading unit 135, and first reference data Dsh1 is acquired.

Next, in Step S108, a black level offset component is removed from first reference data Dsh1 acquired in Step S107 and second reference data Dsh2 acquired in Step S105 using black correction data Bk1 acquired in Step S101, and the ratio of first reference data Dsh1 and second reference data Dsh2 with the black level offset component removed is calculated as the reference data ratio K. In Step S109, the reference data ratio K calculated in Step S108 is stored in the memory 700.

The reference data ratio K is calculated by the following arithmetic expression in terms of pixels of the linear image sensor 201 of the second image reading unit 135.

$$K(i)=(Dsh2(i)-Bk1(i))/(Dsh1(i)-Bk1(i))$$

Figure 12:
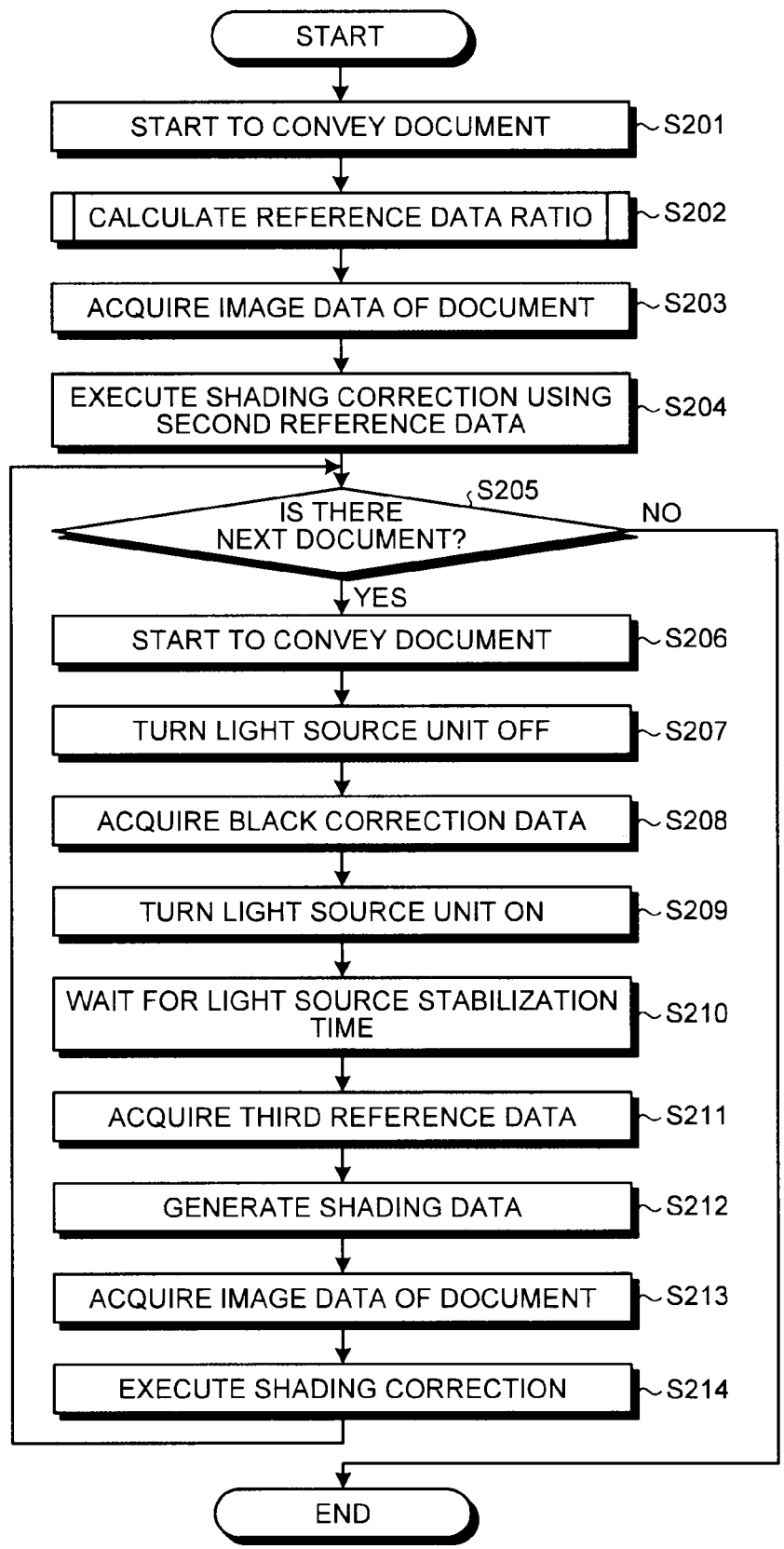
FIG. 12 is a flowchart showing the flow of a sequence of processing which is performed under the control of a controller at the time of executing a job for scanning a document having a plurality of pages.

Dsh1(i): first reference data in the i-th pixel
Dsh2(i): second reference data in the i-th pixel
Bk1(i): black correction data in the i-th pixel
K(i): reference data ratio in the i-th pixel FIG. 12 is a flowchart showing the flow of a sequence of processing which is performed under the control of the controller 150 at the time of executing a job for reading an image of a document having a plurality of pages. In executing a job for reading an image of a document having a plurality of pages, the controller 150 waits for a reading start instruction from the main control unit 10, and the reading start instruction is received, in Step S201, the first page of the document having a plurality of pages set in the document set section A of the ADF 100 starts to be conveyed. While the first page of document is reaching the reading position of the second image reading unit 135, the reference data ratio K is calculated in accordance with the flowchart shown in FIG. 11, and the calculated reference data ratio K is stored in the memory 700 (Step S202).

Thereafter, if the first page of document reaches the reading position of the second image reading unit 135, in Step 5203, the image of the document is read by the second image reading unit 135 to acquire document image data Din. In Step S204, shading correction is executed on document image data Din using second reference data Dsh2, which is used in calculating the reference data ratio K in Step S202, as shading data.

With regard to the second or subsequent page of document, the following processing is repeated. First, in Step S205, it is determined whether or not there is the next document, that is, whether or not the previously processed document is the last page of document, and when there is the next document (Step S205: Yes), in Step S206, the document starts to be conveyed. While the document is reaching the reading position of the second image reading unit 135, the light source unit 200 is turned off (Step S207), the reading operation is carried out by the second image reading unit 135 in a state where the light source unit 200 is turned off, and black correction data Bk2 is acquired (Step S208).

Next, in Step S209, the light source unit 200 is turned on. Thereafter, since it takes time until the light amount is stabilized after the light source unit 200 is turned on, it waits for the light source stabilization time set in advance (Step S210).

Thereafter, before the document reaches the reading position of the second image reading unit 135, in a state where the gap between the reading surface of the second image reading unit 135 and the second scanning roller 136 is substantially equal to that when the image of the document is read, the image of the surface of the second scanning roller 136 is read by the second image reading unit 135, and third reference data Dsh3 is acquired (Step S211). In Step S212, the reference data ratio K is read from the memory 700, and the reference data ratio K is multiplied to third reference data Dsh3 acquired in Step S211 to generate shading data Dsh.

Shading data Dsh is generated in accordance with the following arithmetic expression in terms of pixels of the linear image sensor 201 of the second image reading unit 135.

$$Dsh(i)=(Dsh3(i)-Bk2(i))\times K(i)$$

Dsh(i): shading data in the i-th pixel
Dsh3(i): third reference data in the i-th pixel
Bk2(i): black correction data in the i-th pixel
K(i): reference data ratio in the i-th pixel Thereafter, if the document reaches the reading position of the second image reading unit 135, in Step S213, the image of the document is read by the second image reading unit 135 to acquire document image data Din. In Step S214, shading correction is executed on document image data Din using shading data Dsh generated in Step S212.

Shading correction is executed in accordance with the following arithmetic expression in terms of pixels of the linear image sensor 201 of the second image reading unit 135.

$$Dout(i)=(Din(i)-Bk2(i))/Dsh(i)\times(2^n-1)$$

Dout(i): image data after shading correction in the i-th pixel
Din(i): image data of the document in the i-th pixel The processing of Steps S206 to S214 is repeatedly performed until the reading of the last page of document of the job ends. If the reading of the last page of document ends, and it is determined in Step S205 that there is no next document (Step S205: No), a sequence of processing in the flowchart of FIG. 12 ends.

As described above, in this example, in executing a job for reading an image of a document having a plurality of pages, a reference data ratio is calculated at the head of the job, and the calculated reference data ratio is stored in the memory 700. When shading correction is executed on image data of the second or subsequent page of document, the reference data ratio calculated in advance is multiplied to third reference data which is acquired in a state where the reading surface of the second image reading unit 135 and the second scanning roller 136 is substantially equal to that when the image of the document is read, to generate shading data, and shading correction is executed on document image data using shading data. Therefore, it is possible to reduce the number of movements of the second scanning roller 136, making it possible to suppress degradation in productivity concerned when the movement of the second scanning roller 136 is frequently carried out and to effectively reduce the influence of the illumination depth characteristic by shading correction.

In this example, since the reference data ratio is calculated at the head of the job, in executing a new job, the reference data ratio is updated. Therefore, even when the light amount of the light source unit 200 changes with time, it is possible to generate shading data with good precision in accordance with the changed light amount, thereby executing appropriate shading correction.

In this example, the reference data ratio is calculated in terms of pixels of the linear image sensor 201 of the second image reading unit 135, thereby realizing shading correction with good precision. That is, as described above with reference to FIG. 6, if the scanning distance differs between when shading data is generated and when the image of the document is read, the output ratio differs between shading data and document image data depending on the position in the main scanning direction due to a fluctuation in the illumination depth characteristic. In order to equalize the output ratio, it is effective to correct the distribution shape of shading data in the main scanning direction in terms of pixels. In this example, since the reference data ratio is calculated in terms of pixels, the reference data ratio is calculated in terms of pixels for third reference data, such that shading data with the distribution shape in the main scanning direction corrected in terms of pixels is obtained. It is possible to realize shading correction with good precision using shading data.

The reference data ratio may be calculated in terms of sensor chips in the linear image sensor 201, instead of in terms of pixels of the linear image sensor 201. In this case, the generation of shading data using the calculated reference data ratio or shading correction on document image data using the generated shading data is also executed in terms of sensor chips of the linear image sensor 201. The reference data ratio is calculated in terms of sensor chips of the linear image sensor 201, such that the influence of a fluctuation in the illumination depth characteristic can be suppressed to some extent, and the effect of the reduction in the memory capacity or the reduction in the computational processing time can be expected compared to a case where the reference data ratio is calculated in terms of pixels.

In this example, in calculating the reference data ratio, first, the size of the gap between the reading surface of the second image reading unit 135 and the second scanning roller 136 is smaller than that when the image of the document is read, and second reference data is acquired. Thereafter, the size of the gap between the reading surface of the second image reading unit 135 and the second scanning roller 136 is substantially equal to that when the image of the document is read, and first reference data is acquired. Therefore, it is possible to reduce the time until the image of the document is read after the reference data ratio is calculated, thereby improving productivity. That is, the size of the gap in calculating the first reference data is substantially equal to that when the image of the document is read. Thus, if first reference data is acquired after second reference data is acquired to calculate the reference data ratio, it is not necessary to move the second scanning roller 136 to change the gap while the image of the document is read after the reference data ratio is calculated. Therefore, it is possible to reduce the time until the image of the document is read after the reference data ratio is calculated, thereby improving productivity.

In this example, the second scanning roller 136 which has a roller shape and rotates with a document conveyed is used as a white member which becomes the reference surface for generating shading data. Therefore, it becomes possible to distribute sticking of stain in the rotation direction of the roller, thereby effectively suppressing a problem in that the influence of stain appears in shading data to inhibit appropriate shading correction.

SECOND EXAMPLE

Next, a second example will be described with reference to FIG. 13. In the second example, the number of read sheets of document or the elapsed time after the previous reference data ratio is calculated is counted, and each time a predetermined number of sheets of document are read or each time a predetermined time elapses after the previous reference data ratio is calculated, the reference data ratio is calculated.

Figure 13:
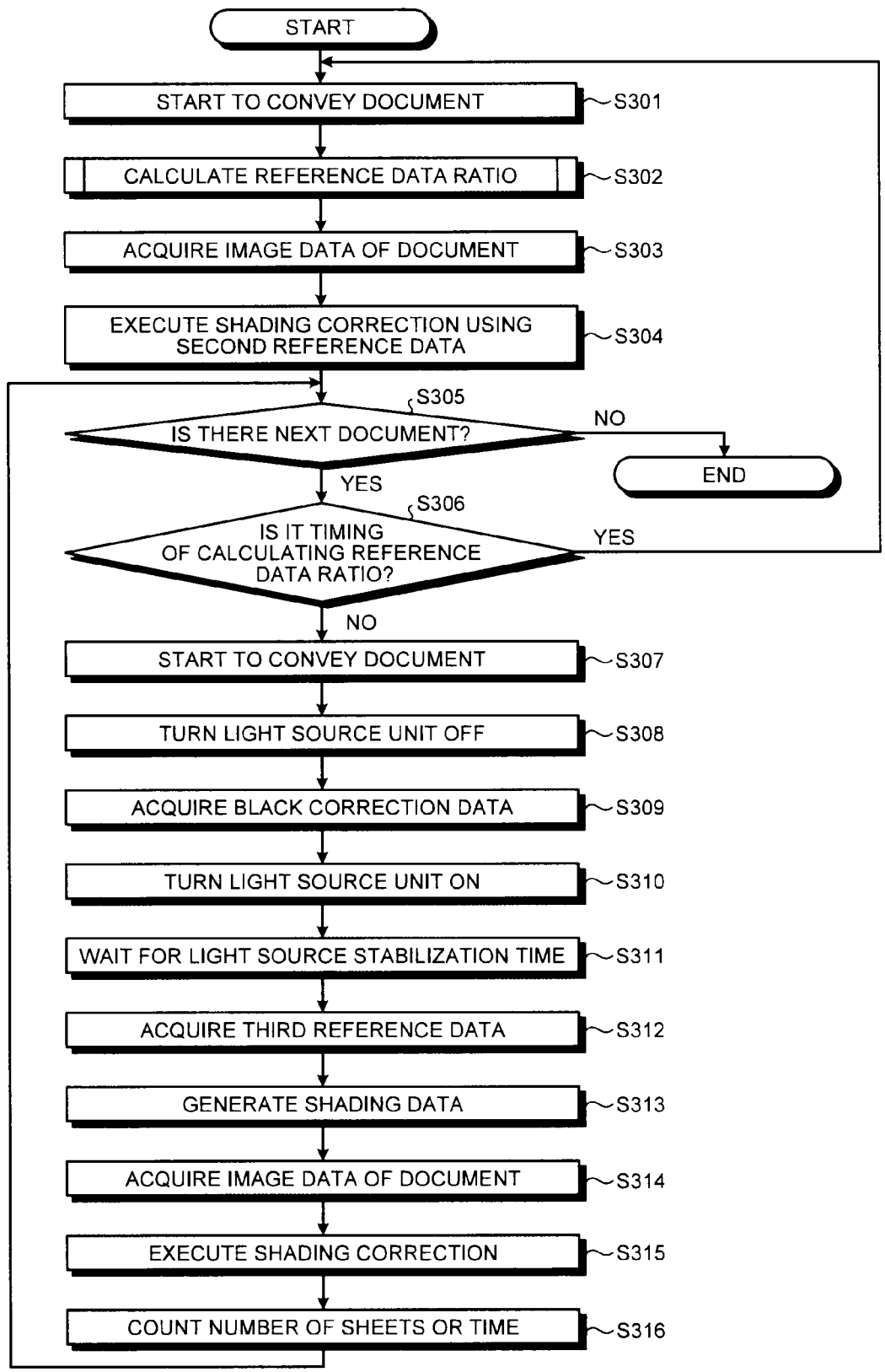
FIG. 13 is a flowchart showing the flow of a sequence of processing in a second example.

FIG. 13 is a flowchart showing the flow of a sequence of processing in this example. In this example, the controller 150 waits for the reading start instruction from the main control unit 10, and if the reading start instruction is received, in Step S301, the document set in the document set section A of the ADF 100 starts to be conveyed. While the document is reaching the reading position of the second image reading unit 135, the reference data ratio is calculated in accordance with the flowchart shown in FIG. 11, and the calculated reference data ratio is stored in the memory 700 (Step S302).

Thereafter, if the document reaches the reading position of the second image reading unit 135, in Step S303, the image of the document is read by the second image reading unit 135, and document image data Din is acquired. In Step S304, shading correction is executed on document image data Din using second reference data used in calculating the reference data ratio in Step S302 as shading data.

Next, in Step S305, it is determined whether or not there is the next document, and if there is no next document (Step S305: No), the processing ends. Meanwhile, when there is the next document (Step S305: Yes), in Step S306, it is determined whether or not it is the timing of calculating the reference data ratio. The determination on whether or not it is the timing of calculating the reference data ratio is made on the basis of the number of read sheets of document or the elapsed time from the calculation of the previous reference data ratio counted in Step S316 described below. That is, when the number of read sheets of document counted in Step S316 reaches a predetermined number of sheets or when the elapsed time from the calculation of the previous reference data ratio counted in Step S316 reaches a predetermined time, it is determined that it is the timing of calculating the reference data ratio.

If it is the timing of calculating the reference data ratio (Step S306: Yes), the count value in Step S316 is reset, the processing returns to Step S301, and the processing of Step S301 and thereafter is repeated. Meanwhile, if it is not the timing of calculating the reference data ratio (Step S306: No), in Step S307, the next document starts to be conveyed. While the next document is reaching the reading position of the second image reading unit 135, the light source unit 200 is turned off (Step S308), the reading operation is carried out by the second image reading unit 135 in a state where the light source unit 200 is turned off, and black correction data Bk2 is acquired (Step S309).

Next, in Step S310, the light source unit 200 is turned on. Thereafter, since it takes time until the light amount is stabilized after the light source unit 200 is turned on, it waits for the light source stabilization time set in advance (Step S311).

Thereafter, before the document reaches the reading position of the second image reading unit 135, in a state where the gap between the reading surface of the second image reading unit 135 and the second scanning roller 136 is substantially equal to that when the image of the document is read, the image of the surface of the second scanning roller 136 is read by the second image reading unit 135 to acquire third reference data Dsh3 (Step S312). In Step S313, the reference data ratio K is read from the memory 700, and the reference data ratio K is multiplied to third reference data Dsh3 acquired in Step S312 to generate shading data Dsh.

Thereafter, if the document reaches the reading position of the second image reading unit 135, in Step S314, the image of the document is read by the second image reading unit 135, and document image data Din is acquired. In Step S315, shading correction is executed on document image data Din using shading data Dsh generated in Step S313.

If shading correction on document image data Din ends, in Step S316, the number of sheets of document having been read hitherto or the elapsed time from the calculation of the previous reference data ratio is counted. Then, the processing returns to Step S305, and the processing of Step S305 and thereafter is repeated.

As described above, in this example, each time a predetermined number of sheets of document are read or each time a predetermined time elapses after the previous reference data ratio is calculated, the reference data ratio is calculated, and the calculated reference data ratio is stored in the memory 700. At the timing at which the reference data ratio is not calculated, the reference data ratio calculated in advance is multiplied to third reference data, which is acquired in a state where the size of the gap between the reading surface of the second image reading unit 135 and the second scanning roller 136 is substantially equal to that when the image of the document is read, to generate shading data, and shading correction is executed on document image data using shading data. Therefore, it is possible to reduce the number of movements of the second scanning roller 136, making it possible to suppress degradation in productivity concerned when the movement of the second scanning roller 136 is frequently carried out and to effectively reduce the influence of the illumination depth characteristic by shading correction.

In this example, each time a predetermined number of sheets of document are read or each time a predetermined time elapses after the previous reference data ratio is calculated, the reference data ratio is calculated, such that the reference data ratio is updated as needed. Therefore, even when the light amount of the light source unit 200 changes with time, it is possible to generate shading data with good precision in accordance with the changed light amount, thereby executing appropriate shading correction.

THIRD EXAMPLE

Next, a third example will be described with reference to FIG. 14. In the third example, when power is supplied to the copying machine 1, that is, when power is supplied to the ADF 100 having a function as an image reader, the reference data ratio is calculated only once.

Figure 14:
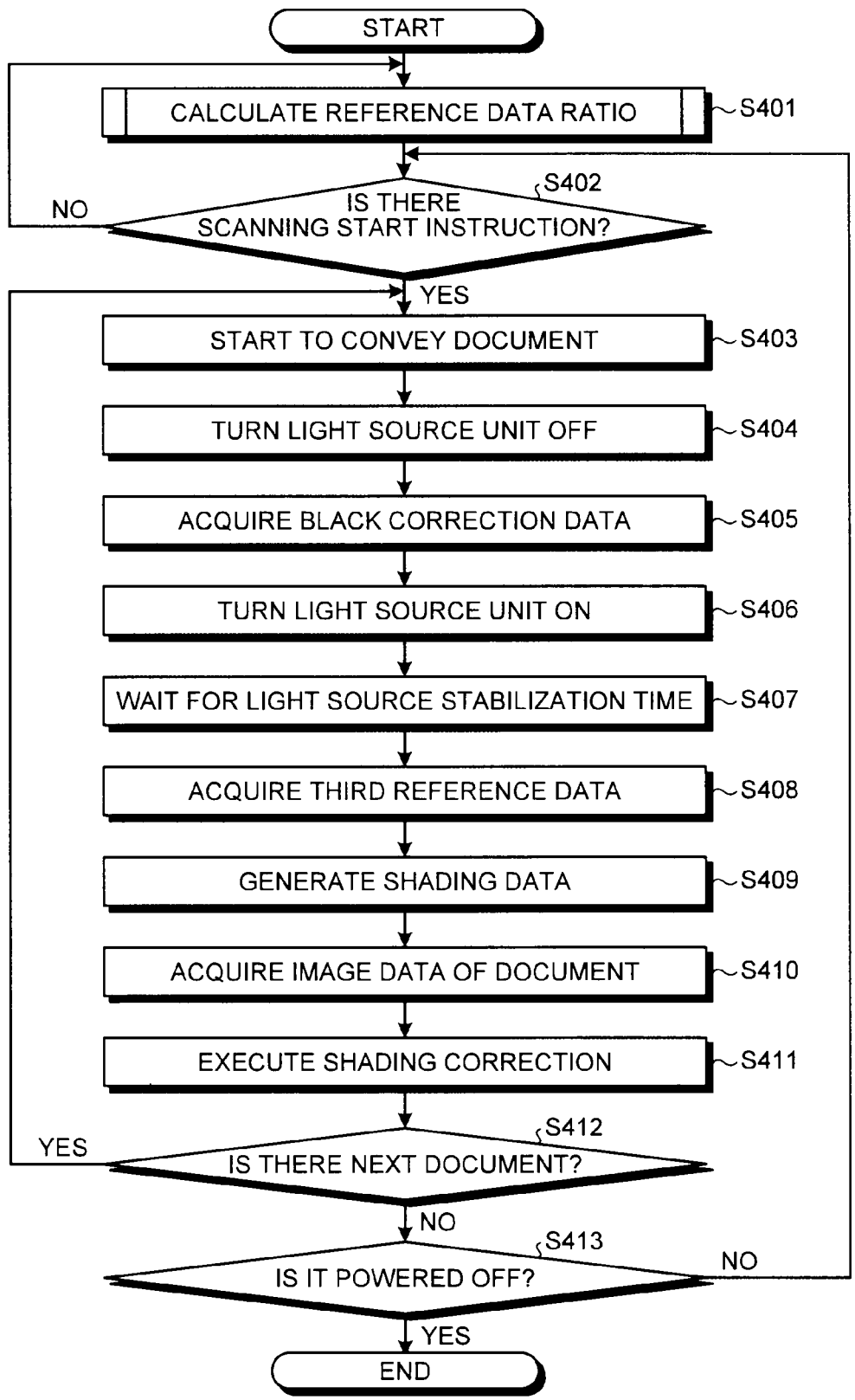
FIG. 14 is a flowchart showing the flow of a sequence of processing in a third example.

FIG. 14 is a flowchart showing the flow of a sequence of processing in this example, which starts at the same time the copying machine 1 is powered on. In this example, if the copying machine 1 is powered on and the processing shown in the flowchart of FIG. 14 starts, first, the reference data ratio is calculated in accordance with the flowchart shown in FIG. 11, and the calculated reference data ratio is stored in the memory 700 (Step S401).

Next, the controller 150 waits for the reading start instruction from the main control unit 10 (Step S402), and if the reading start instruction is received (Step S402: Yes), in Step S403, the document set in the document set section A of the ADF 100 starts to be conveyed. While the document is reaching the reading position of the second image reading unit 135, the light source unit 200 is turned off (Step S404), the reading operation is carried out by the second image reading unit 135 in a state where the light source unit 200 is turned off, and black correction data Bk2 is acquired (Step S405).

Next, in Step S406, the light source unit 200 is turned on. Thereafter, since it takes time until the light amount is stabilized after the light source unit 200 is turned on, it waits for a light source stabilization time set in advance (Step S407).

Thereafter, before the document reaches the reading position of the second image reading unit 135, in a state where the gap between the reading surface of the second image reading unit 135 and the second scanning roller 136 is substantially equal to that when the image of the document is read, the image of the surface of the second scanning roller 136 is read by the second image reading unit 135 to acquire third reference data Dsh3 (Step S408). In Step S409, the reference data ratio K is read from the memory 700, and the reference data ratio K is multiplied to third reference data Dsh3 acquired in Step S408 to generate shading data Dsh.

Thereafter, if the document reaches the reading position of the second image reading unit 135, in Step S410, the image of the document is read by the second image reading unit 135 to acquire document image data Din. In Step S411, shading correction is executed on document image data Din using shading data Dsh generated in Step S409.

Next, in Step S412, it is determined whether or not there is the next document, and if there is the next document (Step S412: Yes), the processing returns to Step S403 and the processing of Step S403 and thereafter is repeated. Meanwhile, if there is no next document (Step S412: No), under the condition that the copying machine 1 is powered on (Step S413: No), the processing returns to Step S402 and it waits for the next reading start instruction. After the copying machine 1 is powered off (Step S413: Yes), a sequence of processing shown in the flowchart of FIG. 14 ends.

As described above, in this example, the reference data ratio is calculated when power is supplied to the copying machine 1, that is, when power is supplied to the ADF 100 having a function as an image reader, and the calculated reference data ratio is stored in the memory 700. Thereafter, when shading correction is executed on document image data read by the second image reading unit 135, reference data ratio calculated in advance is multiplied to third reference data, which is acquired in a state where the size of the gap between the reading surface of the second image reading unit 135 and the second scanning roller 136 is substantially equal to that when the image of the document is read, to generate shading data, and shading correction is executed on document image data using shading data. Therefore, it is possible to minimize the movement of the second scanning roller 136, making it possible to suppress degradation in productivity concerned when the movement of the second scanning roller 136 is frequently carried out and to effectively reduce the influence of the illumination depth characteristic by shading correction.

FOURTH EXAMPLE

Next, a fourth example will be described with reference to FIGS. 15 to 17. In the fourth example, although as in the first example, the reference data ratio is calculated at the head of a job for reading an image of a document having a plurality of pages, in calculating the reference data ratio, the thickness of a document to be conveyed is detected, and the size of the gap between the reading surface of the second image reading unit 135 and the second scanning roller 136 when the image of the document is read is determined in accordance with the detected thickness of the document.

Figure 15:
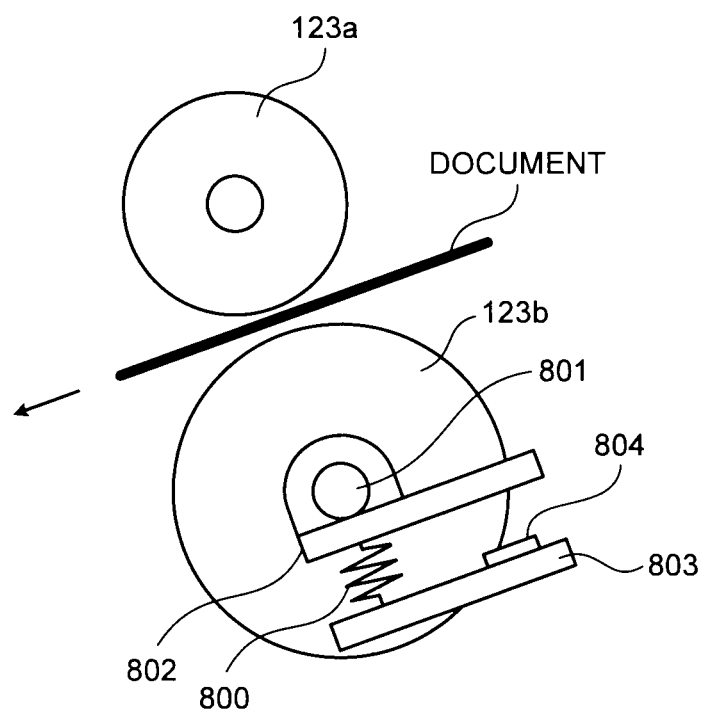
FIG. 15 is a diagram showing an example of a mechanism which detects the thickness of a document to be conveyed.
Figure 16:
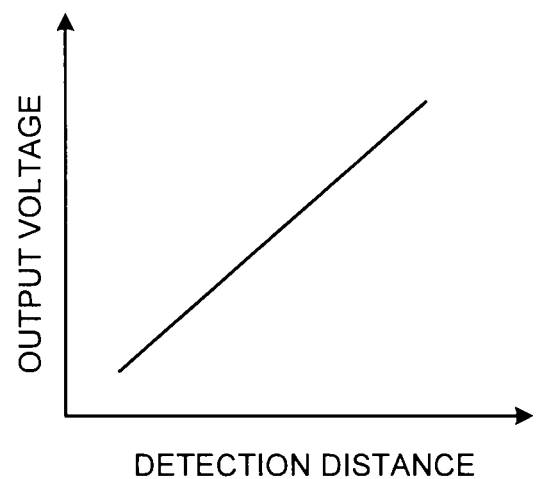
FIG. 16 is a diagram showing a relationship between an output voltage of a displacement sensor and a detection distance.

FIG. 15 is a diagram showing an example of a mechanism which detects the thickness of a document to be conveyed. As shown in FIG. 15, from a pair of pullout rollers 123 (hereinafter, a driving-side roller is referred to as a pullout driving roller 123a, and a driven-side roller is referred to as a pullout driven roller 123b) provided in the registration section C of the ADF 100, the pullout driven roller 123b is biased toward the pullout driving roller 123a by a compression spring 800.

Specifically, the compression spring 800 is arranged between an attachment member 802 which rotatably supports a shaft 801 of the pullout driven roller 123b and an attachment member 803 which is fixed to a housing frame of the ADF 100. The two attachment members 802 and 803 are arranged to face each other, and if a document enters the nip portion between the pullout driving roller 123a and the pullout driven roller 123b, the compression spring 800 is deformed in accordance with the thickness of the document, and the distance between the two attachment members 802 and 803 changes.

A displacement sensor 804 is provided in one (in the example of FIG. 15, the attachment member 803) of the two attachment members 802 and 803, and the output of the displacement sensor 804 is input to the controller 150. For example, the displacement sensor 804 optically detects the distance between the two attachment members 802 and 803, and as shown in FIG. 16, the output voltage and the detection distance are in a proportional relationship. Therefore, the controller 150 can detect the thickness of the document from the difference between the detection distance corresponding to the output voltage when the document enters the nip portion between the pullout driving roller 123a and the pullout driven roller 123b and the detection distance corresponding to the output voltage when the document enters and passes through the nip portion.

Although an example has been described where the mechanism for detecting the thickness of the document is provided in the pullout roller 123, the invention is not limited to this example. The mechanism for detecting the thickness of the document may be provided at a different location on the upstream side of the second image reading unit 135 in the document conveying path, for example, in the reverse roller 121 or the like.

FIG. 17 is a flowchart showing calculation processing of a reference data ratio in this example. In this example, first, in Step S501, the first page of the document having a plurality of pages set in the document set section A of the ADF 100 starts to be conveyed. When the first page of document passes through the nip portion between the pullout driving roller 123a and the pullout driven roller 123b, the thickness of the document is detected on the basis of the output voltage of the displacement sensor 804 (Step S502).

Next, in Step S503, the size (hereinafter, referred to as a distance A) of the gap the reading surface of the second image reading unit 135 and the second scanning roller 136 when the image of the document is read is determined in accordance with the thickness of the document detected in Step S502. In Step S504, the size (for example, A/2; hereinafter, referred to as a distance B) of the gap when acquiring second reference data is determined on the basis of the distance A determined in Step S503.

Next, in Step S505, the reading operation is carried out by the second image reading unit 135 in a state where the light source unit 200 is turned off, and black correction data Bk1 is acquired.

Next, in Step S506, the light source unit 200 is turned on. Thereafter, since it takes time until the light amount is stabilized after the light source unit 200 is turned on, it waits for a light source stabilization time set in advance (Step S507).

Next, in Step S508, the second scanning roller 136 is moved by driving of the stepping motor 106 such that the size of the gap between the reading surface of the second image reading unit 135 and the second scanning roller 136 becomes the distance B determined in Step S504. In Step S509, in a state where the size of the gap between the reading surface of the second image reading unit 135 and the second scanning roller 136 becomes the distance B, the image of the surface of the second scanning roller 136 is read by the second image reading unit 135 to acquire second reference data Dsh2.

Next, in Step S510, the second scanning roller 136 is moved by driving of the stepping motor 106 such that the size of the gap between the reading surface of the second image reading unit 135 and the second scanning roller 136 becomes the distance A determined in Step S503. In Step S511, in a state where the size of the gap between the reading surface of the second image reading unit 135 and the second scanning roller 136 becomes the distance A, the image of the surface of the second scanning roller 136 is read by the second image reading unit 135 to acquire first reference data Dsh1.

Next, in Step S512, black level offset component is removed from first reference data Dsh1 acquired in Step S511 and second reference data Dsh2 acquired in Step S509 using black correction data Bk1 acquired in Step S505, and the ratio of first reference data Dsh1 and second reference data Dsh2 with the black level offset component removed is calculated as the reference data ratio K. In Step S513, the reference data ratio K calculated in Step S512 is stored in the memory 700.

As described above, in this example, in calculating the reference data ratio, the thickness of the document to be conveyed is detected, and the size of the gap between the reading surface of the second image reading unit 135 and the second scanning roller 136 when the image of the document is read is determined in accordance with the detected thickness of the document. Therefore, it is possible to calculate an optimum reference data ratio in accordance with the thickness of a document and to more effectively reduce the influence of the illumination depth characteristic.

Although in this example, taking into consideration that the thickness of the document rarely changed during a single reading job, as in the first example, the reference data ratio is calculated only once at the head of the job for reading the image of the document having a plurality of pages, when it is detected that the thickness of the document changes during the job for reading the image of the document having a plurality of pages, the reference data ratio may be calculated again at that time. Therefore, even when the thickness of the document changes during a single reading job, the same effects as described above can be obtained.

As in the second example, even when the reference data ratio may be calculated each time a predetermined number of sheets of document are read or each time a predetermined time elapses from the calculation of the previous reference data ratio, the same effects as described above can be obtained.

As in the third example, the reference data ratio may be calculated when power is supplied to the copying machine 1, that is, when power is supplied to the ADF 100 having a function as an image reader. In this case, the reference data ratio is calculated in accordance with the thickness of a certain document (normal paper, postcard, thin paper, or the like) when power is supplied and stored in the memory 700. When the image of the document is read, a reference data ratio corresponding to the detected thickness of a document is read to generate shading data, and shading correction is executed. Thus, it becomes possible to reduce the time of reading the image of the document compared to a case where a reference data ratio is intermittently generated at the head of a job, or for every predetermined number of sheets or for every predetermined time, thereby further improving productivity. Even in a continuous reading operation in a state where documents which are different in thickness are mixed, it is not necessary to calculate a reference data ratio each time the thickness of a document changes, thereby further improving productivity.

The user may prepare patterns of normal paper, postcard, thin paper, and the like and may set the thickness of the document by the operation unit 11 before reading the image of the document. In this case, the controller 150 determines the size of the gap between the reading surface of the second image reading unit 135 and the second scanning roller 136 when the image of the document is read in accordance with the thickness of the document set by the user. In this case, the same effects as when the thickness of the document is automatically detected can be obtained.

Although the embodiment and the specific examples of the invention have been described, the invention is not limited to the foregoing embodiment, and can be embodied by modifying components without departing from the scope of the invention when the invention is carried out. For example, although in the foregoing embodiment, the second scanning roller 136 is moved to change the size of the gap between the reading surface of the second image reading unit 135 and the second scanning roller 136, the second image reading unit 135 may be moved or both the second image reading unit 135 and the second scanning roller 136 may be moved to change the length of the gap.

Although in the foregoing embodiment, an example has been described where the invention is applied to the second image reading unit 135 of the ADF 100, when the first image reading unit 131 of the ADF 100 is configured such that an image is read by a CIS system, the invention may also be applied to the first image reading unit 131.

Although in the foregoing embodiment, an example has been described where the invention is applied to the copying machine 1, the invention can be widely applied to an image reader which includes a scanning unit using a CIS system. The invention can be effectively applied to an image forming apparatus, such as a multi-function peripheral or a facsimile machine, other than a copying machine insofar as an image forming apparatus includes such an image reader.

According to the embodiment of the invention, while the size of the gap between the scanning surface of the scanning unit and the white member is substantially equal to that when the image of the document is read, shading correction can be executed generating shading data equivalent to that when the size of the gap is made small. Therefore, it is possible to reduce the influence of the illumination depth characteristic by shading correction without causing degradation in productivity.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reader comprising:
    a scanning unit that scans a document by a contact image sensor system;
    a white member that is arranged to face a scanning surface of the scanning unit;
    a gap variable unit that moves at least one of the scanning unit and the white member to change a size of a gap that is a space between the scanning surface of the scanning unit and the white member;
    a reference data ratio storage unit that stores a reference data ratio as a ratio between first reference data acquired by scanning a surface of the white member by the scanning unit in a state where the size of the gap is substantially equal to a size of the gap when the document is scanned and second reference data acquired by scanning the surface of the white member by the scanning unit in a state where the size of the gap is smaller than the size of the gap when the document is scanned;
    a shading data generation unit that causes the scanning unit to scan the surface of the white member in the state where the size of the gap is substantially equal to the size of the gap when the document is scanned to acquire third reference data and multiplies the third reference data by the reference data ratio to generate shading data; and
    a shading correction unit that corrects image data of the document scanned by the scanning unit using the shading data.

2. The image reader according to claim 1, further comprising:
    a reference data ratio calculation unit that causes the scanning unit to scan the surface of the white member in the state where the size of the gap is substantially equal to the size of the gap when the document is scanned to acquire the first reference data, causes the scanning unit to scan the surface of the white member in the state where the size of the gap is smaller than the size of the gap when the document is scanned to acquire the second reference data, and calculates the reference data ratio.

3. The image reader according to claim 2, wherein the reference data ratio calculation unit calculates the reference data ratio based on reference data corresponding to individual pixels of the scanning unit.

4. The image reader according to claim 2, wherein the scanning unit has a plurality of sensor chips, and
    the reference data ratio calculation unit calculates the reference data ratio based on image data that is read from light reflected from the document and condensed by sensor chips.

5. The image reader according to claim 2, wherein, when a job for scanning a document having a plurality of pages is executed, the reference data ratio calculation unit calculates reference data ratio at the head of the job only once.

6. The image reader according to claim 2, wherein the reference data ratio calculation unit calculates the reference data ratio each time a predetermined number of sheets of the document are scanned.

7. The image reader according to claim 2, wherein the reference data ratio calculation unit calculates the reference data ratio each time a predetermined time elapses.

8. The image reader according to claim 2, wherein the reference data ratio calculation unit calculates the reference data ratio only once when power is supplied to the image reader.

9. The image reader according to claim 2, further comprising:
    a document thickness detection unit which detects a thickness of the document scanned by the scanning unit; and
    a gap determination unit which determines the size of the gap when the document is scanned in accordance with the thickness of the document.

10. The image reader according to claim 2, wherein the reference data ratio calculation unit causes the scanning unit to scan the surface of the white member in the state where the size of the gap is smaller than the size of the gap when the document is scanned to acquire the second reference data and then causes the scanning unit to scan the surface of the white member in the state where the size of the gap is substantially equal to the size of the gap when the document is scanned to acquire the first reference data.

11. The image reader according to claim 9, wherein the reference data ratio calculation unit causes the scanning unit to scan the surface of the white member in the state where the size of the gap is smaller than the size of the gap when the document is scanned to acquire the second reference data and then causes the scanning unit to scan the surface of the white member in the state where the size of the gap is substantially equal to the size of the gap when the document is scanned to acquire the first reference data.

12. The image reader according to claim 1, wherein the white member has a roller shape.

13. An image forming apparatus including an image reader and an image forming unit, wherein the image reader comprises:
    a scanning unit that scans a document by a contact image sensor system;
    a white member that is arranged to face a scanning surface of the scanning unit;
    a gap variable unit that moves at least one of the scanning unit and the white member to change a size of a gap that is a space between the scanning surface of the scanning unit and the white member;
    a reference data ratio storage unit that stores a reference data ratio as the ratio between first reference data acquired by scanning a surface of the white member by the scanning unit in a state where the size of the gap is substantially equal to a size of the gap when the document is scanned and second reference data acquired by scanning the surface of the white member by the scanning unit in a state where the size of the gap is smaller than the size of the gap when the document is scanned;
    a shading data generation unit that causes the scanning unit to scan the surface of the white member in the state where the size of the gap is substantially equal to the size of the gap when the document is scanned to acquire third reference data and multiplies the third reference data by the reference data ratio to generate shading data; and a shading correction unit that corrects image data of the document scanned by the scanning unit using the shading data, and the image forming unit carries out image formation on the basis of image data output from the image reader.

14. A method of correcting image data, performed by an image reader, wherein the image reader includes:

- a scanning unit which scans a document by a contact image sensor system;
- a white member which is arranged to face a scanning surface of the scanning unit;
- a gap variable unit which moves at least one of the scanning unit and the white member to change a size of a gap that is a space between the scanning surface of the scanning unit and the white member;
- a reference data ratio calculation unit;
- a reference data ratio storage unit;
- a shading data generation unit; and
- a shading correction unit, and the method comprising:

causing, by the reference data ratio calculation unit, the scanning unit to scan a surface of the white member in a state where the size of the gap is substantially equal to a size of the gap when the document is scanned to acquire first reference data;

causing, by the reference data ratio calculation unit, the scanning unit to scan the surface of the white member in a state where the size of the gap is smaller than the size of the gap when the document is scanned to acquire second reference data;

calculating, by the reference data ratio calculation unit, a reference data ratio as the ratio between the first reference data and the second reference data;

storing, by the reference data ratio storage unit, the calculated reference data ratio;

causing, by the shading data generation unit, the scanning unit to scan the surface of the white member in the state where the size of the gap is substantially equal to the size of the gap when the document is scanned to acquire third reference data and multiplying the third reference data by the reference data ratio to generate shading data; and correcting, by the shading correction unit, image data of the document scanned by the scanning unit using the generated shading data.

* * * * *